United States Patent
Fang et al.

(10) Patent No.: US 12,339,539 B1
(45) Date of Patent: Jun. 24, 2025

(54) DISPLAY MODULE AND DISPLAY DEVICE

(71) Applicant: Xiamen Tianma Micro-Electronics Co., Ltd., Xiamen (CN)

(72) Inventors: Liting Fang, Xiamen (CN); Xiaofen Chen, Xiamen (CN); Ling Wu, Xiamen (CN); Xiaohe Li, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 18/768,555

(22) Filed: Jul. 10, 2024

(30) Foreign Application Priority Data

Mar. 1, 2024 (CN) .......................... 202410238398.6

(51) Int. Cl.
*G02F 1/13357* (2006.01)
*G02B 27/01* (2006.01)
*G02F 1/1335* (2006.01)

(52) U.S. Cl.
CPC .... *G02F 1/133611* (2013.01); *G02B 27/0101* (2013.01); *G02F 1/133528* (2013.01); *G02F 1/133605* (2013.01); *G02B 2027/0118* (2013.01); *G02F 1/133606* (2013.01)

(58) Field of Classification Search
CPC ......... G02F 1/133611; G02F 1/133528; G02F 1/133605; G02B 27/0101; G02B 2027/0118
See application file for complete search history.

(56) References Cited

U.S. PATENT DOCUMENTS

| | | | |
|---|---|---|---|
| 5,828,488 A | 10/1998 | Ouderkirk et al. | |
| 6,906,767 B1* | 6/2005 | Iijima | G02F 1/13362 349/114 |
| 2009/0296028 A1* | 12/2009 | Lee | G02B 5/3025 349/96 |
| 2012/0069276 A1* | 3/2012 | Ishikawa | G02F 1/1396 349/103 |
| 2019/0293974 A1* | 9/2019 | Chen | G02F 1/1323 |
| 2020/0284965 A1* | 9/2020 | Peng | G02F 1/134336 |
| 2021/0302637 A1* | 9/2021 | Haag | G02B 5/305 |
| 2022/0171234 A1* | 6/2022 | Usukura | G02F 1/133536 |
| 2023/0358941 A1* | 11/2023 | Nichol | G02B 6/002 |

FOREIGN PATENT DOCUMENTS

EP 3699678 B1 8/2020

* cited by examiner

*Primary Examiner* — Charles S Chang
(74) *Attorney, Agent, or Firm* — Anova Law Group, PLLC

(57) ABSTRACT

A display module and a display device are provided. The display module includes a backlight module and a liquid crystal panel disposed oppositely to the backlight module. The liquid crystal panel is disposed on a side of a light-emitting surface of the backlight module. The display module includes a display surface. The display surface is located on a side of the liquid crystal panel away from the backlight module. A side of the liquid crystal panel facing the display surface includes a first polarizer, and a side of the liquid crystal panel away from the display surface includes a second polarizer. At least one of the first polarizer and the second polarizer is a reflection polarizer.

18 Claims, 10 Drawing Sheets

DISPLAY MODULE AND DISPLAY DEVICE

CROSS-REFERENCE TO RELATED APPLICATION

The present disclosure claims priority of Chinese Patent Application No. 202410238398.6, filed on Mar. 1, 2024, the entire content of which is hereby incorporated by reference.

FIELD OF THE DISCLOSURE

The present disclosure generally relates to the field of display technology and, more particularly, relates to a display module and a display device.

BACKGROUND

Head-Up Display (HUD) systems have gradually been widely used in the automotive field. Generally, when an HUD system displays an image, a display module emits light of the display image, and then the light of the display image is projected onto the front windshield for display. The display image may include important information, including information displayed on instruments during driving, vehicle speed, and navigation. Accordingly, a driver may read the important information without lowering his head. As such, the driver may conveniently obtain the important information on the display image, and driving safety may thus be improved. An HUD system may help a novice who is inexperienced in speed judgment to control his driving speed and avoid speeding violations on speed-limited roads. More importantly, with an HUS system, a driver may read instantly without shifting the large field of view, and may always maintain the best observation state. Accordingly, driving safety may be improved.

One of key performance features of an HUD system is readability under sunlight. Under bright ambient light, improving brightness and contrast is critical to user experience. Nowadays, under the premise of keeping necessary color saturation, an existing HUD system generally adopts a design with a liquid crystal display module.

However, in existing technology, when an HUD system is used, the liquid crystal display module may be affected by external ambient temperature, resulting in display quality problems. For example, sunlight backflow or external heat may automatically heat up the interior of a display module, and the heat absorbed may aggravate the thermal motion of molecules in polarizers in the display module. Accordingly, when temperature increases, the internal balance of the polarizers in the display module may be destroyed. In a severe case, the polarizers may fail, affecting the display quality of the display image.

As such, providing a display module and a display device that may ease the problem of heat backflow caused by sunlight and other external environments and may improve display quality, is an urgent technical problem that needs to be solved by those skilled in the art.

SUMMARY

One aspect of the present disclosure includes a display module. The display module includes a backlight module and a liquid crystal panel disposed oppositely to the backlight module. The liquid crystal panel is disposed on a side of a light-emitting surface of the backlight module. The display module includes a display surface. The display surface is located on a side of the liquid crystal panel away from the backlight module. A side of the liquid crystal panel facing the display surface includes a first polarizer, and a side of the liquid crystal panel away from the display surface includes a second polarizer. At least one of the first polarizer and the second polarizer is a reflection polarizer.

Another aspect of the present disclosure includes a display device. The display device includes a display module. The display module includes a backlight module and a liquid crystal panel disposed oppositely to the backlight module. The liquid crystal panel is disposed on a side of a light-emitting surface of the backlight module. The display module includes a display surface. The display surface is located on a side of the liquid crystal panel away from the backlight module. A side of the liquid crystal panel facing the display surface includes a first polarizer, and a side of the liquid crystal panel away from the display surface includes a second polarizer. At least one of the first polarizer and the second polarizer is a reflection polarizer.

Other aspects of the present disclosure may be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
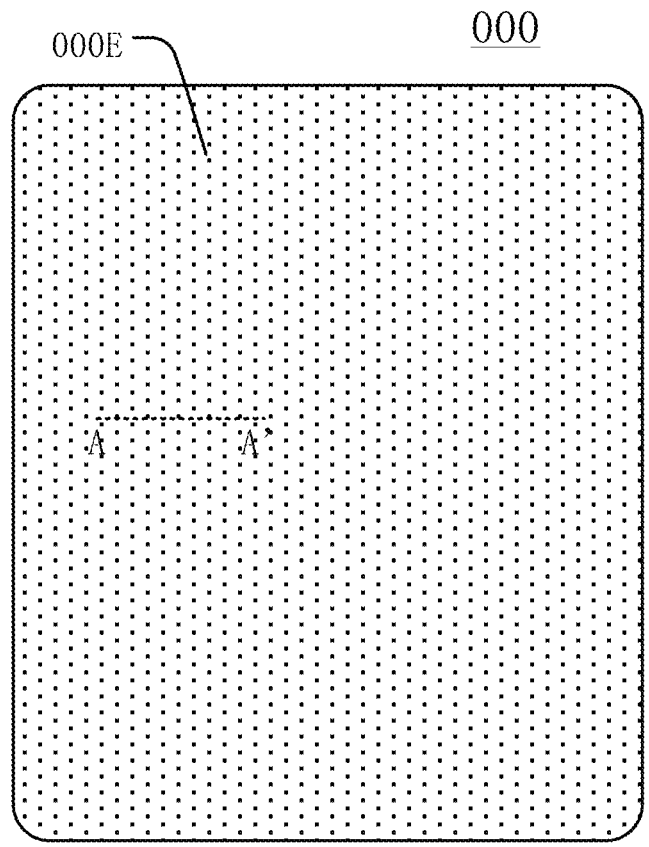
FIG. 1 illustrates a schematic planar structural diagram of a display module consistent with the disclosed embodiments of the present disclosure.

To make the objectives, technical solutions and advantages of the present disclosure clearer and more explicit, the present disclosure is described in further detail with accompanying drawings and embodiments. It should be understood that the specific exemplary embodiments described herein are only for explaining the present disclosure and are not intended to limit the present disclosure.

Technologies, methods, and equipment known to those of ordinary skill in relevant fields may not be discussed in detail, but where appropriate, these technologies, methods, and equipment should be regarded as part of the present disclosure.

In each embodiment of the present disclosure, each specific value is to be construed as illustrative only and not as limiting. Accordingly, a different embodiment may have a different value.

Reference will now be made in detail to embodiments of the present disclosure, which are illustrated in the accompanying drawings. Similar labels and letters designate similar items in the drawings. Once an item is defined in one drawing, the item may not be defined and discussed in subsequent drawings.

Figure 2:
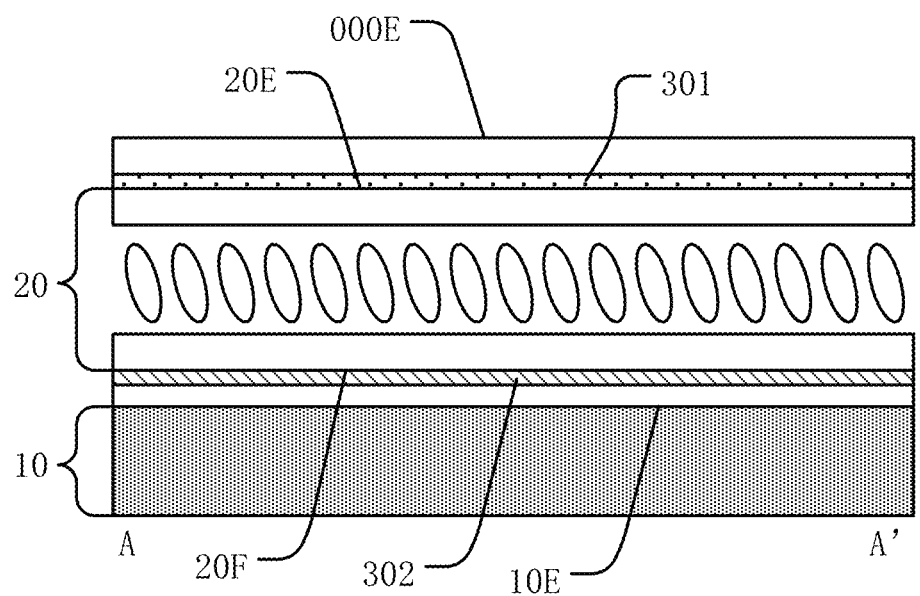
FIG. 2 illustrates a schematic cross-sectional structural diagram along the A-A' direction in FIG. 1, consistent with the disclosed embodiments of the present disclosure.

FIG. 1 illustrates a schematic planar structural diagram of a display module consistent with the disclosed embodiments of the present disclosure. FIG. 2 illustrates a schematic cross-sectional structural diagram along the A-A' direction in FIG. 1. Referring to FIGS. 1 and 2, the present provides a display module 000. The display module 000 includes: a backlight module 10 and a liquid crystal panel 20 arranged oppositely to the backlight module 10. The liquid crystal panel 20 is located on a side of a light-emitting surface 10E of the backlight module 10.

The display module 000 includes a display surface 000E. The display surface 000E is located on a side of the liquid crystal panel 20 away from the backlight module 10. A side of the liquid crystal panel 20 facing the display surface 000E includes a first polarizer 301. A side of the liquid crystal panel 20 away from the display surface 000E includes a second polarizer 302. At least one of the first polarizer 301 and the second polarizer 302 is a reflection polarizer.

Specifically, the display module 000 may be a liquid crystal display module. The display module 000 includes the backlight module 10 and the liquid crystal panel 20 arranged oppositely to the backlight module 10. The backlight module 10 is configured to provide a backlight source for the liquid crystal panel 20. The liquid crystal panel 20 is located on a side of the light-emitting surface 10E of the backlight module 10. As shown in FIG. 2, the light-emitting surface 10E of the backlight module 10 may be understood as a side surface, forming the backlight source, of the backlight module 10. The display module 000 includes the display surface 000E. The display surface 000E is located on a side of the liquid crystal panel 20 away from the backlight module 10. The display surface 000E may be understood as a side surface, displaying images to users, of the entire display module 000. Compared with the light-emitting surface 10E of the backlight module 10, the display surface 000E of the display module 000 is closer to the light-emitting surface 20E of the liquid crystal panel 20. A light incident surface 20F of the liquid crystal panel 20 faces the light-emitting surface 10E of the backlight module 10. As shown in FIG. 2, the light incident surface 20F of the liquid crystal panel 20 is configured to receive light from the backlight source formed by the backlight module 10.

Optionally, the liquid crystal panel 20 may include a color filter (CF) substrate, a thin film transistor (TFT) array substrate, and a liquid crystal (LC) layer sandwiched between the color filter substrate and the thin film transistor array substrate. The color filter substrate and thin film transistor array substrate may generally use glass as a base, and other materials may also be used as the base. The liquid crystal panel 20 may not emit light by itself and may need to be used with the backlight source provided by the backlight module 10. A working principle of the liquid crystal panel 20 may include controlling the rotation of liquid crystal molecules in the liquid crystal layer by applying a driving voltage on the CF substrate and the TFT substrate, and changing the polarization state of the light from the backlight module 10. In addition, an upper polarizer and a lower polarizer disposed outside the liquid crystal panel 20 may realize propagation and blocking of the light path to control the amount of light transmission. The light from the backlight module 10 may finally be refracted and produce an image. Optionally, in one embodiment, according to the different incident positions of the light source, the backlight module 10 may be generally divided into two types: side-type backlight module and directly-below-type backlight module. The present disclosure does not limit a specific type and a specific structure of the backlight module 10. In a specific implementation, the backlight module 10 may be selected according to actual needs.

In one embodiment, the first polarizer 301 may be understood as a polarizer closest to the structure of the liquid crystal panel 20, on a side of the light-emitting surface 20E of the liquid crystal panel 20 facing the display surface 000E. The second polarizer 302 may be understood as a polarizer closest to the structure of the liquid crystal panel 20, on a side of the light incident surface 20F of the liquid crystal panel 20 facing the backlight module 10. That is, the first polarizer 301 and the second polarizer 302 may be understood as an upper polarizer and a lower polarizer on an upper side and a lower side of the outside of the liquid crystal panel 20, respectively. In some other embodiments, the first polarizer 301 and the second polarizer 302 may be understood as additional polarizers in addition to the upper polarizer and the lower polarizer on the upper side and the lower side of the liquid crystal panel 20. Details will be described in subsequent embodiments. The present disclosure does not limit a specific configuration, provided that that the side of the liquid crystal panel 20 facing the display surface 000E includes the first polarizer 301 and the side of the liquid crystal panel 20 away from the display surface 000E includes the second polarizer 302. For example, as shown in FIG. 2, the first polarizer 301 is the polarizer closest to the structure of the liquid crystal panel 20 on the side of the light-emitting surface 20E of the liquid crystal panel 20 facing the display surface 000E. The second polarizer 302 is the polarizer closest to the structure of the liquid crystal panel 20 on the side of the light incident surface 20F of the liquid crystal panel 20 facing the backlight module 10.

In one embodiment, the first polarizer 301 is the polarizer closest to the structure of the liquid crystal panel 20 on the side of the light-emitting surface 20E of the liquid crystal panel 20 facing the display surface 000E. The second polarizer 302 is the polarizer closest to the structure of the liquid crystal panel 20 on the side of the light incident surface 20F of the liquid crystal panel 20 facing the backlight module 10. The second polarizer 302 is configured to convert the light beam generated on the side of the light-emitting surface 10E of the backlight module 10 into polarized light. The first polarizer 301 is configured to resolve the polarized light modulated by the liquid crystal layer of the liquid crystal panel 20 to generate light-dark contrast, thereby generating a display image. For specific working principles of the first polarizer 301 and the second polarizer 302 in liquid crystal display technology, reference may be made to descriptions of liquid crystal display panels in related technologies, which will not be elaborated here.

It should be noted that the present disclosure does not elaborate on specific structures of the backlight module 10 and the liquid crystal panel 20. In a specific implementation, the structure of the display module 000 may include but is not limited to the above-mentioned structures. Structural detail of the display module 000 may be understood with reference to structures of liquid crystal display modules in the related art.

In existing designs of liquid crystal display modules, the polarizers located on the upper and lower sides of the liquid crystal display panel are generally absorption polarizers. Absorption polarizers are generally iodine-based polarizers. Iodine molecules of iodine-based polarizers may be adsorbed on polyvinyl alcohol (PVA), and may absorb polarized light in a direction same as the stretching direction of the PVA and may transmit polarized light perpendicular to the stretching direction of the PVA. As a result, polarization may be achieved. Though iodine-based polarizers may have optical properties of high polarization, iodine-based polarizers may have poor resistance to high temperature. Especially when the liquid crystal display module is used in a high-temperature environment or exposed to sunlight, heat absorbed may intensify the thermal motion of the molecules in the iodine-based polarizer, and thus the temperature may increase. When the temperature increases, the balance inside the polarizer may be destroyed, and in a severe case, the polarizer may fail. In addition, the liquid crystal layer in the liquid crystal panels of existing liquid crystal display modules generally use thermotropic liquid crystal. Once the polarizer absorbs too much heat and the heat reaches the liquid crystal layer, the temperature of the liquid crystal molecules may increase, the anisotropy of the liquid crystal may decrease. As such, the transmittance of the liquid crystal panel may decrease, and the transmittance of the entire liquid crystal display module may thus decrease.

To solve the above problem, in one embodiment, at least one of the first polarizer 301 and the second polarizer 302 is a reflection polarizer. That is, the first polarizer 301 disposed on the side of the liquid crystal panel 20 facing the display surface 000E is a reflection polarizer; alternatively, the second polarizer 302 disposed on the side of the liquid crystal panel 20 away from the display surface 000E is a reflection polarizer; and alternatively, the first polarizer 301 disposed on the side of the liquid crystal panel 20 facing the display surface 000E is a reflection polarizer, and the second polarizer 302 disposed on the side of the liquid crystal panel 20 away from the display surface 000E is also a reflection polarizer.

Figure 3:
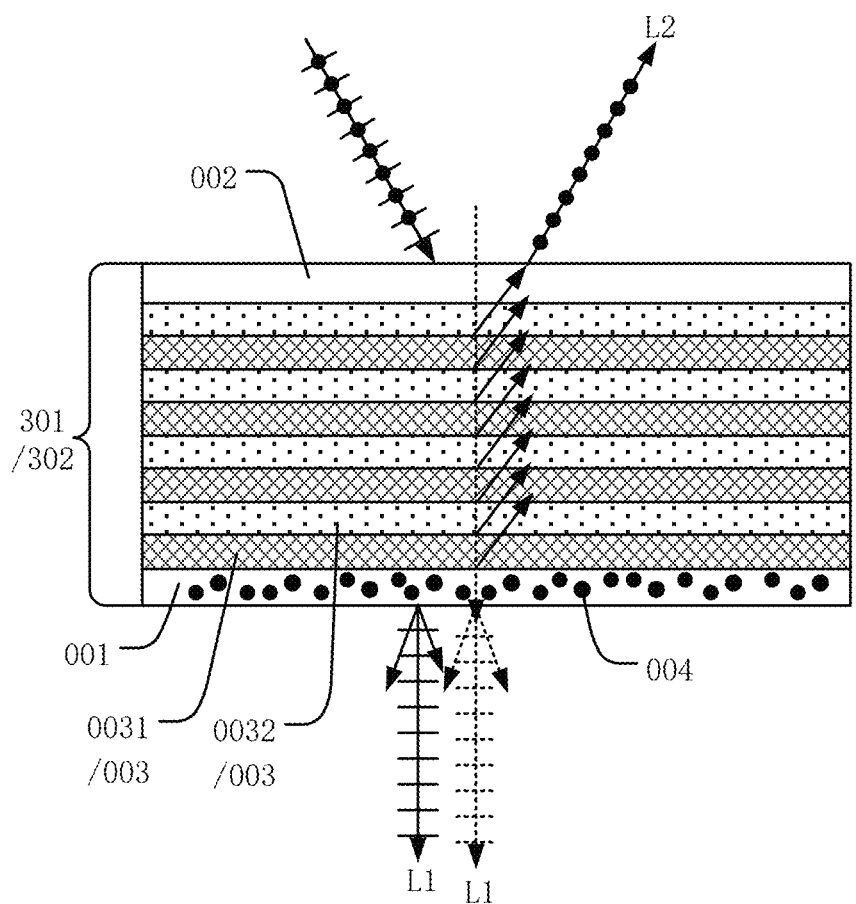
FIG. 3 illustrates a schematic diagram of an optical path transmission principle of a reflection polarizer, consistent with the disclosed embodiments of the present disclosure.

FIG. 3 illustrates a schematic diagram of an optical path transmission principle of a reflection polarizer. As shown in FIGS. 1-3, according to the principle of optical path transmission, when light is incident on a surface of a reflection polarizer, the incident light and reflected light determine a plane (hereinafter referred to as an incident plane). Based on the principle of polarization of light, when the incident light enters the reflection polarizer, the incident light is split, producing a first light L1 (hereinafter referred to as P light) and a second light L2 (hereinafter referred to as S light). Exit directions of the P light and the S light are perpendicular to each other. For a light beam incident on the surface of the reflection polarizer, the light whose polarization direction is parallel to the incident plane is generally defined as P light (indicated by an arrow with a plurality of short straight lines in FIG. 3 and subsequent figures). P light may pass through the reflection polarizer and continue to propagate to the film layer below the reflection polarizer. The light whose polarization direction is perpendicular to the incident plane is defined as S light (indicated by an arrow with a plurality of dots in FIG. 3 and subsequent figures). S light may be reflected back by the reflection polarizer. That is, S light may not propagate through the reflection polarizer. It should be noted that, in the present disclosure, S light and P light may each be linearly polarized light, but reference positions of S light and P light to the incident plane are different.

As shown in FIG. 3, in one embodiment, at least one of the first polarizer 301 and the second polarizer 302 is a reflection polarizer. The structure of the reflection polarizer may include a first protective layer 001 and a second protective layer 002 arranged oppositely to the first protective layer 001. The first protective layer 001 and the second protective layer 002 may protect the entire reflection polarizer film layer, and N (N is a positive integer) pieces of stacked optical film sets 003 are included between the first protective layer 001 and the second protective layer 002. One optical film set 003 includes a first optical film 0031 and a second optical film 0032. The refractive index of the first optical film 0031 is different from the refractive index of the second optical film 0032. That is, the optical film set 003 of the reflection polarizer may include two layers of films with specific refractive index difference that are alternately stacked. For example, the refractive index of the first optical film 0031 may be greater than the refractive index of the second optical film 0032. When the material of the first optical film 0031 is formed, a film layer, with a certain axial refractive index increased while the other axial refractive index unchanged, may be formed through a stretching process. The axis with a larger refractive index is a non-transmissive axis. The material of the second optical film 0032 may have a same refractive index in each axis.

When light is transmitted to the plurality of optical film sets 003, the light whose polarization direction is along the transmission axis direction may be directly guided through the multi-layer stacked optical film sets 003 (the light shown by the solid line in FIG. 3). The light whose polarization direction is along the non-transmission axis changes the traveling speed and direction of the light due to the difference in refractive index between the front and rear layers, and finally reaches the total reflection angle. Thus, the direction of light travel is reversed and reflected. The polarization direction of the downward polarized light may be changed after reflection. The downward polarized light may be reversed and continue to pass through the multi-layer stacked optical film set 003 (the light indicated by the dotted line in FIG. 3). During this process, the multi-layer stacked optical film set 003 may absorb very little polarized light, so the light efficiency may be improved.

In one embodiment, N pieces of stacked optical film sets 003 (N≥200) are included between the first protective layer 001 and the second protective layer 002 of the reflection polarizer. For a reflection polarizer, the more the stacked optical film sets 003, such as greater than or equal to approximately 200, the higher the polarization level. The higher the polarization level, the more the S-light may be reflected back and reused through the reflection polarizer. In one embodiment, the quantity of stacked layers of the optical film group 003 is set to be greater than or equal to approximately 200. Accordingly, the polarization level of the reflection polarizer may be improved, the reflection effect may be improved, and thus the heat resistance performance of the reflection polarizer may be improved.

Optionally, as shown in FIG. 3, in one embodiment, at least one of the first polarizer 301 and the second polarizer 302 is a reflection polarizer. In the structure of the reflection polarizer, the side of the reflection polarizer facing the display surface 000E includes a plurality of diffusion particles 004. The diffusion particles 004 may be doped into the surface film layer of the reflection polarizer. Through doping the plurality of diffusion particles 004, the light propagation angle may be expanded after being scattered by the diffusion particles 004, and the effect of diffusion may be achieved. Accordingly, the light emitted from the reflection polarizer may be diffused and the light emitted may be more uniform.

It should be noted that the present disclosure does not limit the quantity, material, and doping ratio of the diffusion particles included in the reflection polarizer. During specific implementation, the quantity, material, and doping ratio of the diffusion particles may be set with reference to a manufacturing process of diffusion particles in related technologies.

Figure 4:
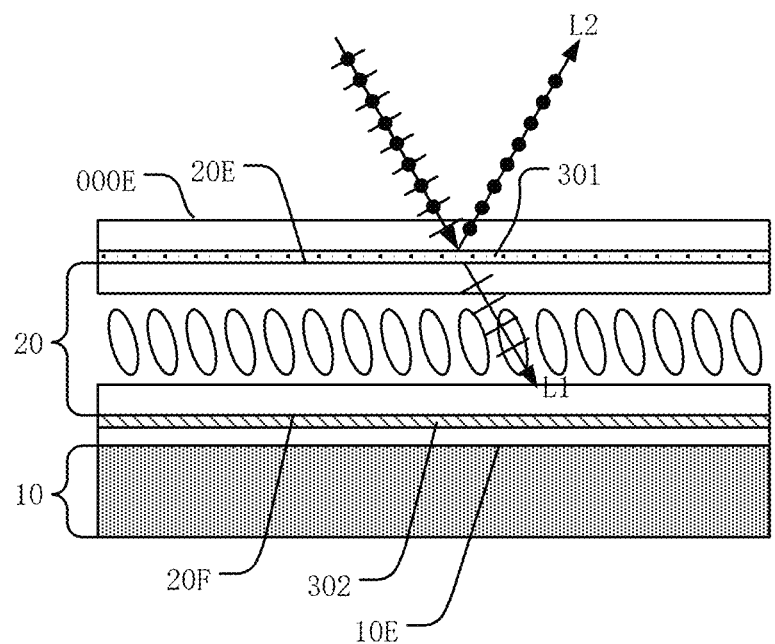
FIG. 4 illustrates a schematic diagram of an optical path transmission structure of a display module in FIG. 2, consistent with the disclosed embodiments of the present disclosure.

FIG. 4 illustrates a schematic diagram of an optical path transmission structure of a display module in FIG. 2. As shown in FIGS. 1-4, in one embodiment, the first polarizer 301 disposed on the side of the liquid crystal panel 20 facing the display surface 000E is a reflection polarizer. That is, only the first polarizer 301 disposed on the side close to the display surface 000E of the display module 000 is a reflection polarizer. The at least one reflection polarizer is disposed on the side of the entire display module 000 facing the external environment. When the external sunlight reaches the first polarizer 301, the P light in the external sunlight may pass through and continue to propagate to the liquid crystal layer of the liquid crystal panel 20, while the S light in the external sunlight may be reflected by the first polarizer 301. Accordingly, heat in sunlight may be blocked, and the problems of sunlight backflow and temperature increase may be eased. Since the S light incident on the first polarizer 301 may be reflected to the external environment, the possibility of the heat generated by sunlight being absorbed by the first polarizer 301 may be reduced. That is, the failure risk of the first polarizer 301 caused by excessive heat absorption may be reduced, and the polarization performance of the first polarizer 301 may be improved. In addition, since the S light incident on the first polarizer 301 may be reflected back to the external environment, excessive heat reaching the liquid crystal layer of the liquid crystal panel 20 may be prevented. Accordingly, temperature increase of the liquid crystal molecules may be prevented, and anisotropy of the liquid crystal may not be reduced. That is, the transmittance of the liquid crystal panel may not be affected. As such, the transmittance of the entire liquid crystal display module may be improved.

Figure 5:
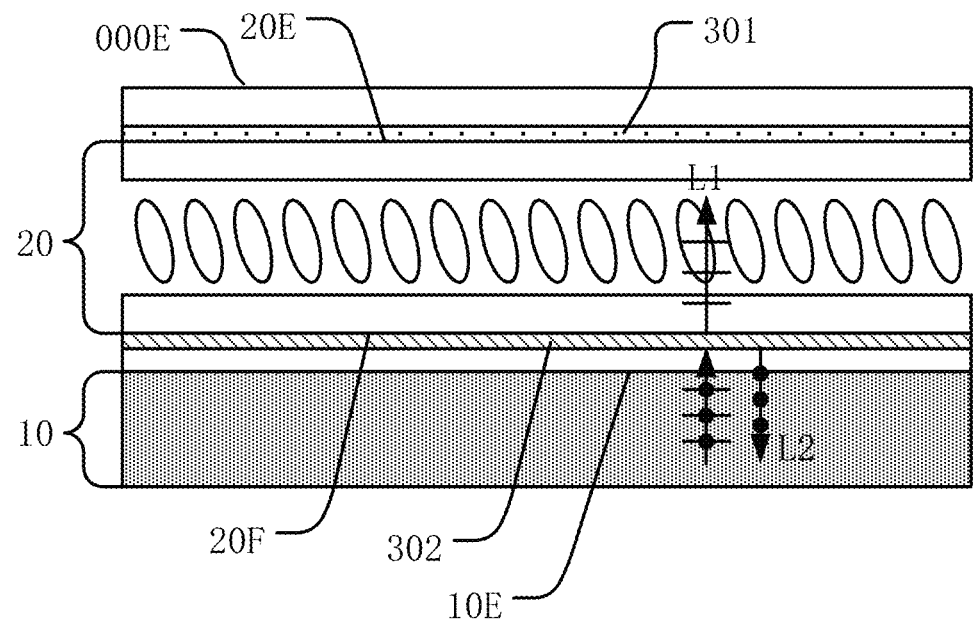
FIG. 5 illustrates a schematic diagram of another optical path transmission structure of a display module in FIG. 2, consistent with the disclosed embodiments of the present disclosure.

FIG. 5 illustrates a schematic diagram of another optical path transmission structure of a display module in FIG. 2. As shown in FIGS. 1-3 and 5, in one embodiment, the second polarizer 302 disposed on the side of the liquid crystal panel 20 away from the display surface 000E is a reflection polarizer. That is, only the second polarizer 302 disposed on the side of the light incident surface 20F of the liquid crystal panel 20 is a reflection polarizer. In the backlight source emitted from the backlight module 10, when the P light reaches the second polarizer 302, the P light may pass through and continue to propagate to the liquid crystal layer of the liquid crystal panel 20. The S light may be reflected by the second polarizer 302. As such, the heat generated by the backlight module may be blocked from reaching the liquid crystal layer, and the problem of temperature increase may be eased. Since the S light incident on the second polarizer 302 may be reflected back into the backlight module 10, the possibility of heat being absorbed by the second polarizer 302 may be reduced. That is, the failure risk of the second polarizer 302 caused by excessive heat absorption may be reduced, and the polarization performance of the second polarizer 302 may be improved. In addition, since the S light incident on the second polarizer 302 may be reflected back into the backlight module 10, excessive heat reaching the liquid crystal layer of the liquid crystal panel 20 may be prevented, and the temperature of the liquid crystal molecules may not increase. Accordingly, the anisotropy of the liquid crystal may not be reduced, that is, the transmittance of the liquid crystal panel may not be affected. As such, the transmittance of the entire liquid crystal display module may be improved.

It should be noted that in one embodiment, in the backlight source emitted from the backlight module 10, the S light incident on the second polarizer 302 may be reflected back into the backlight module 10. The display module 000 generally needs to meet high brightness requirements, and correspondingly, the backlight brightness of the backlight module 10 may be at a level of million nits. The backlight module 10 at a level of million nits may be a heat source itself. As such, when the S light incident on the second polarizer 302 is reflected back into the backlight module 10, there may be no heat impact on the backlight module 10.

Figure 6:
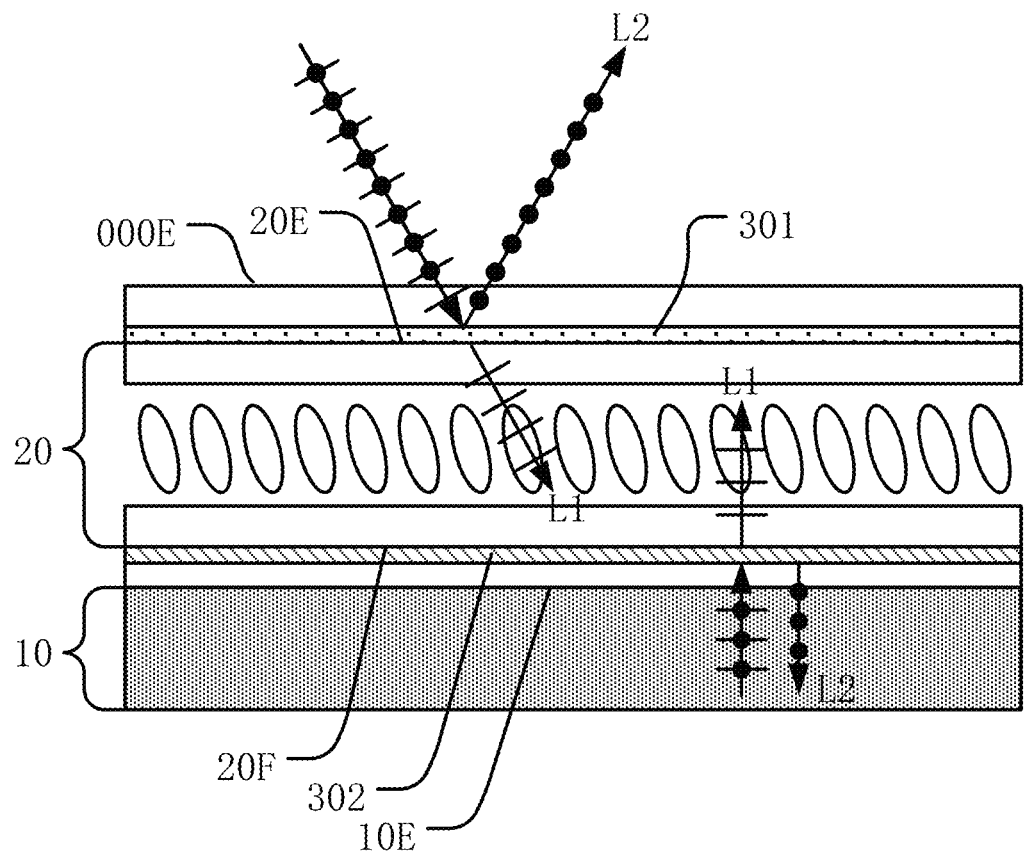
FIG. 6 illustrates a schematic diagram of another optical path transmission structure of a display module in FIG. 2, consistent with the disclosed embodiments of the present disclosure.

FIG. 6 illustrates a schematic diagram of another optical path transmission structure of a display module in FIG. 2. As shown in FIGS. 1-3 and 6, in one embodiment, the first polarizer 301 disposed on the side of the liquid crystal panel 20 facing the display surface 000E is a reflection polarizer.

The second polarizer 302 disposed on the side of the liquid crystal panel 20 away from the display surface 000E is also a reflection polarizer. That is, not only the first polarizer 301 disposed on the side close to the display surface 000E of the display module 000 is a reflection polarizer, but the second polarizer 302 disposed on the side of the light incident surface 20F of the liquid crystal panel 20 is also a reflection polarizer. When the P light in the external sunlight reaches the first polarizer 301, the P light may pass through and continue to propagate to the liquid crystal layer of the liquid crystal panel 20. The S light may be reflected by the first polarizer 301. In addition, in the backlight source emitted from the backlight module 10, when the P light from reaches the second polarizer 302, the P light may pass through and continue to propagate to the liquid crystal layer of the liquid crystal panel 20. The S light may be reflected by the second polarizer 302. Accordingly, not only the heat in sunlight may be blocked, but also the heat generated by the backlight module may be blocked from reaching the liquid crystal layer. As such, the problems of sunlight backflow and temperature increase may be eased.

As shown in FIG. 6, the S light incident on the first polarizer 301 may be reflected back to the external environment, and the S light incident on the second polarizer 302 is reflected back into the backlight module 10. As such, not only the possibility of the heat generated by sunlight being absorbed by the first polarizer 301 may be reduced, but also the possibility of the heat being absorbed by the second polarizer 302 may be reduced. That is, the failure risks of the first polarizer 301 and the second polarizer 302 caused by excessive heat absorption may be reduced, and the polarization performance of the transmission light path in the entire module may be improved. In addition, since the S light incident on the first polarizer 301 may be reflected back into the external environment, and the S light incident on the second polarizer 302 may be reflected back into the backlight module, excessive heat may not reach the liquid crystal layer of the liquid crystal panel 20, the temperature of the liquid crystal molecules may not increase, and the anisotropy of the liquid crystal may not be reduced. That is, the transmittance of the liquid crystal panel may not be affected, and the transmittance of the entire liquid crystal display module may be improved.

In one embodiment, at least one of the first polarizer 301 on the side of the liquid crystal panel 20 facing the display surface 000E and the second polarizer 302 on the side of the liquid crystal panel 20 away from the display surface 000E is a reflection polarizer. Since the reflection polarizer may absorb part of the light and reflect part of the light, the reflection polarizer may block heat and the temperature of the reflection polarizer may not increase because of absorbing heat. Accordingly, the reflection polarizer may reduce the risk of polarizer failure caused by excessive heat absorption, the polarization performance of the transmission optical path in the entire module may be improved, and display quality may be improved. In addition, since part of the light incident on the reflection polarizer may be reflected back, excessive heat reaching the liquid crystal layer of the liquid crystal panel 20 may prevented, and the temperature of the liquid crystal molecules may not increase. As such, the anisotropy of the liquid crystal may not be reduced, that is, the transmittance of the liquid crystal panel may not be affected, and the transmittance and display quality of the entire liquid crystal display module may be improved.

In a specific implementation, other structures may also be disposed on a side of the first polarizer 301 facing the light-emitting surface 20E of the liquid crystal panel 20, on a side of the first polarizer 301 facing the display surface 000E of the display module 000, on a side of the second polarizer 302 facing the light-incident surface 20F of the liquid crystal panel 20, and on a side of the second polarizer 302 facing the light output surface 10E of the backlight module 10. The other structures may include other polarizers, protective layers or covers. The present disclosure does not limit a specific type of the other structures, provided that at least one of the first polarizer 301 on the side of the liquid crystal panel 20 facing the display surface 000E and the second polarizer 302 on the side of the liquid crystal panel 20 away from the display surface 000E is a reflection polarizer such that heat blocking effects may be achieved.

Figure 7:
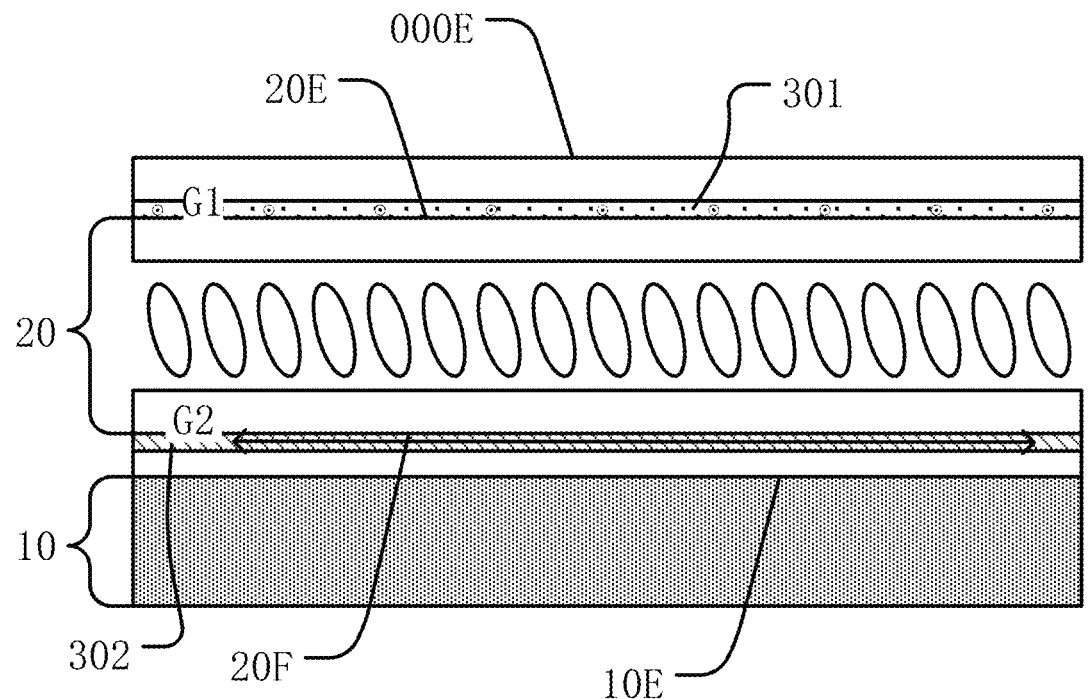
FIG. 7 illustrates a schematic diagram of polarization axis directions of a first polarizer and a second polarizer in FIG. 2, consistent with the disclosed embodiments of the present disclosure.

FIG. 7 illustrates a schematic diagram of polarization axis directions of a first polarizer and a second polarizer in FIG. 2. Referring to FIGS. 1-2 and 7, in one embodiment, the direction of the polarization axis of the first polarizer 301 and the direction of the polarization axis of the second polarizer 302 are perpendicular to each other.

A polarizer may control the polarization direction of a specific light beam. A polarizer may have different light absorption properties in two directions perpendicular to each other. Absorption of light in one direction may be much less than absorption of light in the other direction. The direction with much less absorption of light is the polarization axis of the polarizer, also called the transmission axis. The polarization axis of the polarizer is the polarization direction of the light after passing through the polarizer. For an absorption polarizer, when natural light passes through the absorption polarizer, the light whose oscillation direction is perpendicular to the polarization axis of the polarizer may be absorbed. Only the polarized light whose oscillation direction is parallel to the polarization axis of the polarizer may remain in the transmitted light. For a reflection polarizer, when natural light passes through the reflection polarizer, the light whose oscillation direction is perpendicular to the polarization axis of the polarizer may not be absorbed but may be reflected. Only the polarized light whose oscillation direction is parallel to the polarization axis of the polarizer may remain in the transmitted light.

In one embodiment, the first polarizer 301 and the second polarizer 302 may be understood as an upper polarizer and a lower polarizer on upper and lower sides of the liquid crystal panel 20, respectively. That is, the first polarizer 301 is the polarizer closest to the structure of the liquid crystal panel 20 on the side of the light-emitting surface 20E of the liquid crystal panel 20 facing the display surface 000E. The second polarizer 302 is the polarizer closest to the structure of the liquid crystal panel 20 on the side of the light incident surface 20F of the liquid crystal panel 20 facing the backlight module 10. The direction of the polarization axis of the first polarizer 301 and the direction of the polarization axis of the second polarizer 302 are perpendicular to each other. For example, as shown in FIG. 7, the direction of the polarization axis of the first polarizer 301 is direction G1, and the direction of the polarization axis of the second polarizer 302 is direction G2. The direction G1, noted by a point within a circle in FIG. 7, refers to a direction perpendicular to the paper surface, that is, a direction perpendicular to the plane seen by readers.

In one embodiment, the direction of the polarization axis of the first polarizer 301 located on the side of the liquid crystal panel 20 facing the display surface 000E and the direction of the polarization axis of the second polarizer 302 on the side of the liquid crystal panel 20 away from the display surface 000E are perpendicular to each other. The light emitted by the backlight source formed by the backlight module 10 may be natural light. The second polarizer 302 may convert the light beam generated by the backlight into polarized light, and the polarized light may then be incident on the liquid crystal layer of the liquid crystal panel 20. The first polarizer 301 may resolve the polarized light modulated by the liquid crystal of the liquid crystal layer to produce a light-dark contrast, thus generating a display image. If the direction of the polarization axis of the first polarizer 301 on the side of the liquid crystal panel 20 facing the display surface 000E is same as the direction of the polarization axis of the second polarizer 302 on the side of the liquid crystal panel 20 away from the display surface 000E, a user may not see a display image on the side of the display surface 000E of the display module. Accordingly, imaging of a liquid crystal display module relies on polarized light. In addition, the direction of the polarization axis of the first polarizer 301 and the direction of the polarization axis of the second polarizer 302 are perpendicular to each other, to achieve normal display of the liquid crystal display module.

Figure 8:
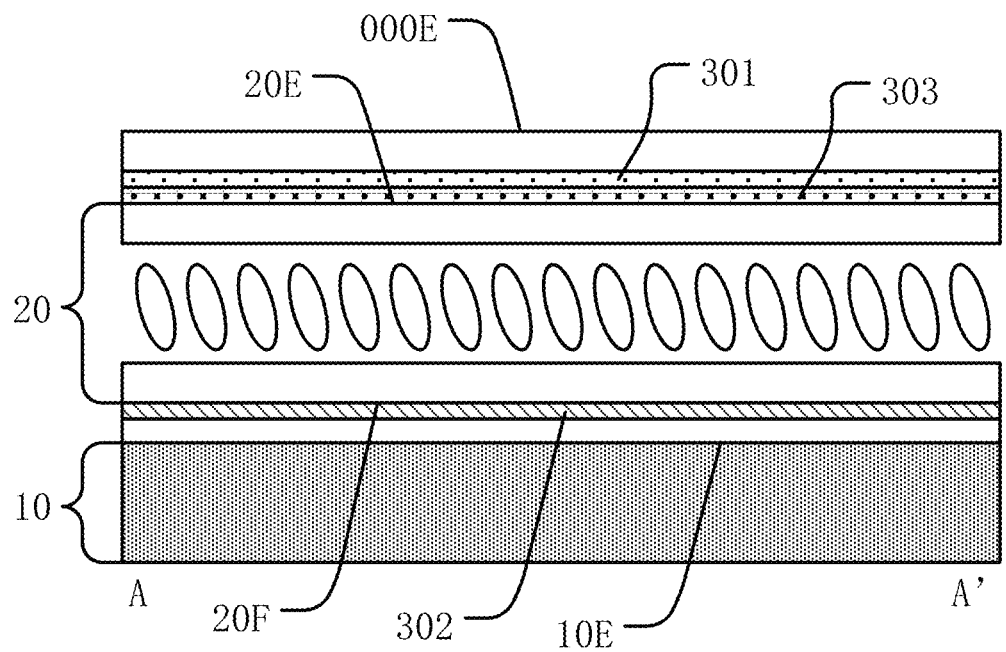
FIG. 8 illustrates another schematic cross-sectional structural diagram along the A-A' direction in FIG. 1, consistent with the disclosed embodiments of the present disclosure.

FIG. 8 illustrates another schematic cross-sectional structural diagram along the A-A' direction in FIG. 1. Referring to FIGS. 1 and 8, in one embodiment, the first polarizer 301 is a reflection polarizer, and the second polarizer 302 is a reflection polarizer. A third polarizer 303 is disposed between the first polarizer 301 and the liquid crystal panel 20, and the third polarizer 303 is a reflection polarizer.

In one embodiment, the polarizers located on the light entrance surface 20F and the light-emitting surface 20E of the liquid crystal panel 20 may each be reflection polarizers. Specifically, the side of the light-emitting surface 20E of the liquid crystal panel 20 facing the display surface 000E includes the first polarizer 301 and the third polarizer 303 that are stacked. The third polarizer 303 is disposed between the first polarizer 301 and the liquid crystal panel 20. The side of the first polarizer 301 away from the liquid crystal panel 20 includes the display surface 000E of the display module 000. The first polarizer 301 and the third polarizer 303 are each reflection polarizers. The polarization level may be increased by the stacked reflection polarizers. The higher the polarization level, the more light from sunlight may be reflected back, and the more heat may be blocked. As such, excessive heat reaching the liquid crystal layer of the liquid crystal panel 20 may be prevented, and the temperature increase of the liquid crystal molecules may be prevented. The transmittance of the liquid crystal panel may be improved, and the transmittance and display quality of the entire liquid crystal display module may be improved. In addition, the first polarizer 301 is closer to the display surface 000E of the display module 000 than the third polarizer 303, that is, closer to the sunlight irradiation surface. In this configuration, by designing the first polarizer 301 closer to the sunlight irradiation surface as a reflection polarizer, the light reflection effect may be improved. More sunlight may be reflected, and better temperature improvement effect may be achieved.

Still referring to FIGS. 1 and 8, in one embodiment, the first polarizer 301 is a reflection polarizer, and the second polarizer 302 is a reflection polarizer. The third polarizer 303 is disposed between the first polarizer 301 and the liquid crystal panel 20, and the third polarizer 303 is an absorption polarizer.

In one embodiment, the first polarizer 301 located on the light-emitting surface 20E side of the liquid crystal panel 20 and the second polarizer 302 located on the light-incident surface 20F side of the liquid crystal panel 20 may each be reflection polarizers. The third polarizer 303 may be disposed between the first polarizer 301 and the liquid crystal panel 20, and the third polarizer 303 may be an absorption polarizer. Specifically, the first polarizer 301 and a third polarizer 303 that are stacked may be disposed between the display surface 000E of the display module 000 and the liquid crystal panel 20. Compared with the third polarizer 303, the first polarizer 301 is closer to the display surface 000E of the display module 000, that is, closer to the sunlight irradiation surface. In this configuration, by designing the first polarizer 301 closer to the sunlight irradiation surface as a reflection polarizer, a better reflection effect on light may be achieved. More sunlight may be reflected, and better effect of temperature improvement may be achieved.

The third polarizer 303 closer to the light-emitting surface 20E of the liquid crystal panel 20 may be an absorption polarizer. Absorption polarizers generally have better polarization effects, that is, higher level of polarization. Since the third polarizer 303 disposed on the light-emitting surface 20E side of the liquid crystal panel 20 is an absorption polarizer, light leakage when the screen is black may be reduced. Accordingly, the liquid crystal panel 20 may be prevented from emitting light when no electric field is applied, a better black state display image may be achieved, and the display contrast of the module may be improved.

Optionally, in one embodiment, in the liquid crystal panel 20, the liquid crystal molecules in the liquid crystal layer may be negative liquid crystals. Negative liquid crystals (liquid crystals with larger vertical dielectric) may have a higher contrast. When at least one of the first polarizer 301 and the second polarizer 302 is set as a reflection polarizer, the contrast may be affected to a certain extent. However, since negative liquid crystals themselves may have high contrast, the contrast of the entire display module 000 may be improved and compensated to a certain extent. That is, display modules using negative liquid crystals may accept a certain degree of contrast reduction caused by polarizers.

Optionally, as shown in FIG. 8, in one embodiment, no other polarizer is included between the second polarizer 302 and the liquid crystal panel 20. That is, the second polarizer 302 is the polarizer closest to the light incident surface 20F of the liquid crystal panel 20. The second polarizer 302 may be designed as a reflection polarizer, and part of the light incident on the second polarizer 302 may be reflected back to the backlight module 10. Accordingly, the possibility of heat being absorbed by the second polarizer 302 may be reduced, that is, the failure risk of the second polarizer 302 caused by excessive heat absorption may be reduced. As such, the polarization performance of the transmission optical path in the entire module may be improved.

Figure 9:
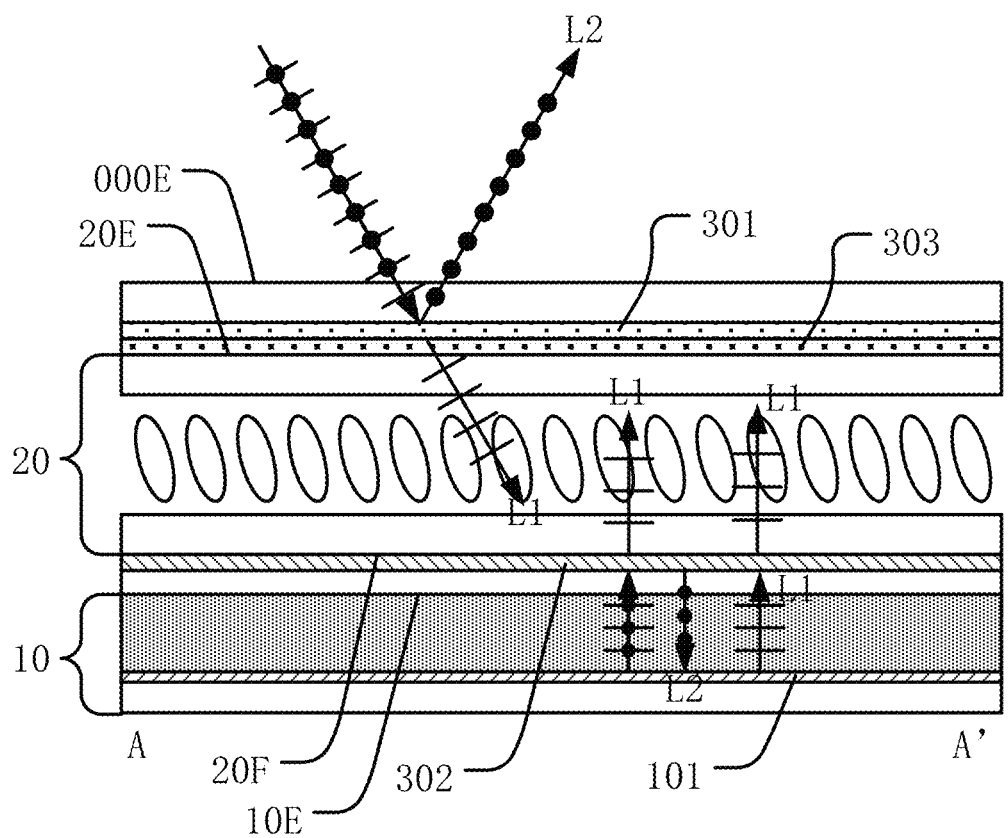
FIG. 9 illustrates another schematic cross-sectional structural diagram along the A-A' direction in FIG. 1, consistent with the disclosed embodiments of the present disclosure.

FIG. 9 illustrates another schematic cross-sectional structural diagram along the A-A' direction in FIG. 1. Referring to FIGS. 1 and 9, in one embodiment, the backlight module 10 includes a reflective sheet 101. The backlight module 10 generally includes a plurality of optical films. The plurality of optical films may include the reflective sheet 101. The reflective sheet in the plurality of optical films may be located on the side of the backlight module 10 away from the light-emitting surface 10E. When the second polarizer 302 is a reflection polarizer, the second polarizer 302 may be used with the reflective sheet 101 of the backlight module 10. In the light beam of the backlight source, P light (first light L1) may pass through the second polarizer 302 and be incident on the liquid crystal panel 20. The S light (second light L2) in the backlight source reflected by the second polarizer 302 may be reflected by the reflective sheet 101, and then become P light (first light L1) and be reused. The reflected S light may be incident on the liquid crystal panel 20 (as shown in the optical path in FIG. 9) through the second polarizer 302, and the transmittance of the light may thus be improved. Accordingly, the light utilization rate of the backlight module 10 may be improved, and the display brightness and display effect of the display module may be improved.

It is understandable that, the S light in the backlight source reflected by the second polarizer 302 may become P light after being reflected by the reflective sheet 101, because half-wave loss may occur after being reflected by the reflective sheet 101. When light is emitted from an optically sparse medium to an optically dense medium, the oscillation direction of the reflected light has a phase change of π relative to the incident light. Then, the S light may become P light after being reflected by the reflective sheet 101. This will not be explained again in subsequent embodiments.

It should be noted that FIG. 9 only schematically illustrates the structure of the backlight module 10. In a specific implementation, the structure of the backlight module may include but may not be limited to the structure shown in FIG. 9. The structure of the backlight module may also include other film layer structures, such as brightness enhancement films, light guide plates, diffusion sheets, etc., which will not be elaborated here.

Figure 10:
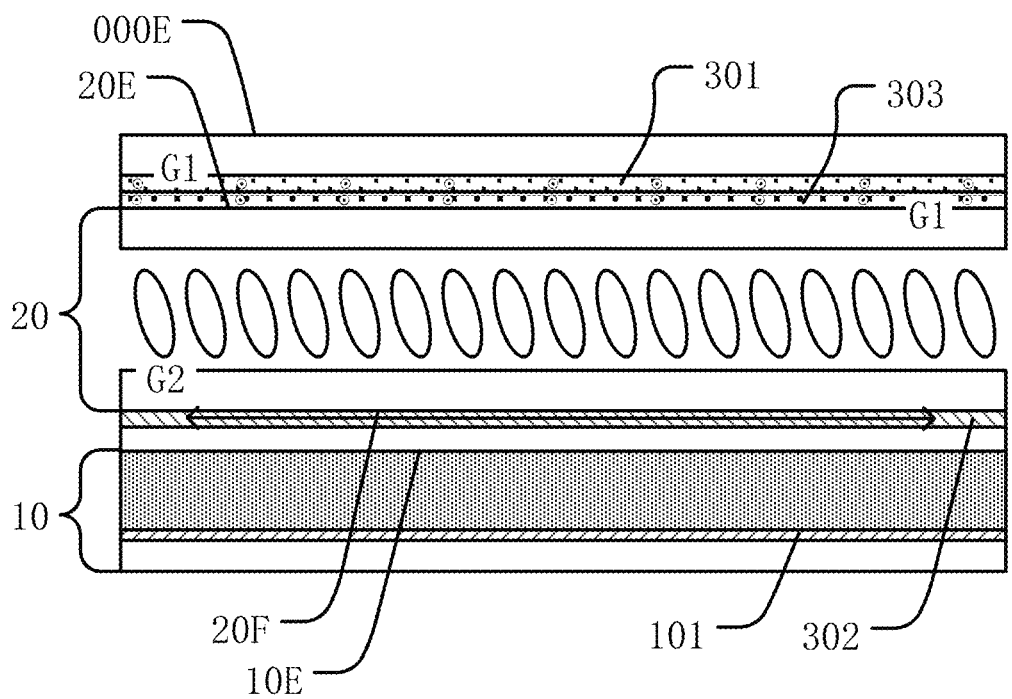
FIG. 10 illustrates a schematic diagram of polarization axis directions of a first polarizer, a second polarizer, and a third polarizer in FIG. 8, consistent with the disclosed embodiments of the present disclosure.

FIG. 10 illustrates a schematic diagram of polarization axis directions of a first polarizer, a second polarizer, and a third polarizer in FIG. 8. As shown in FIGS. 1, 8 and 10, in one embodiment, the first polarizer 301 and the third polarizer 303 that are stacked are included between the display surface 000E and the liquid crystal panel 20 of the display module. The first polarizer 301 and the third polarizer 303 are located on a same side of the liquid crystal panel 20 facing toward the display surface 000E of the display module 000. The direction of the polarization axis of the first polarizer 301 and the direction of the polarization axis of the third polarizer 303 are same.

In one embodiment, the directions of the polarization axes of the first polarizer 301 and the third polarizer 303 located on a same side of the liquid crystal panel 20 facing the display surface 000E of the display module 000 are same. The directions of the polarization axes of the first polarizer 301 and the second polarizer 302 located on different sides of the liquid crystal layer of the liquid crystal panel 20 are perpendicular to each other. For example, as shown FIG. 10, the direction of the polarization axis of the first polarizer 301 and the direction of the polarization axis of the third polarizer each 303 are the direction G1. The direction G1, noted by a point within a circle in FIG. 10, refers to a direction perpendicular to the paper surface, that is, a direction perpendicular to the plane seen by readers. The direction of the polarization axis of the second polarizer 302 is the direction G2. In this way, the light that is split by the third polarizer 303 and passes through the third polarizer 303 may continue to pass through the first polarizer 301 and reach the display surface 000E of the display module 000 to be seen by a user. The display function of the display module 000 may thus be realized.

Figure 11:
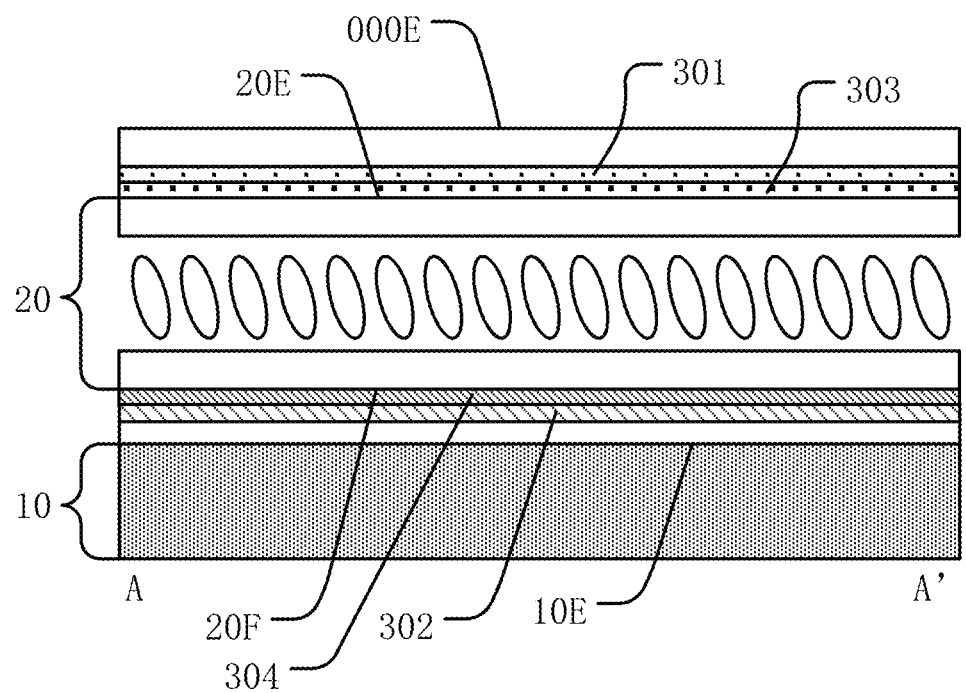
FIG. 11 illustrates another schematic cross-sectional structural diagram along the A-A' direction in FIG. 1, consistent with the disclosed embodiments of the present disclosure.

FIG. 11 illustrates another schematic cross-sectional structural diagram along the A-A' direction in FIG. 1. Referring to FIGS. 1 and 11, in one embodiment, the first polarizer 301 is a reflection polarizer, and the second polarizer 302 is a reflection polarizer. A third polarizer 303 is included between the first polarizer 301 and the liquid crystal panel 20, and the third polarizer 303 is an absorption polarizer. A fourth polarizer 304 is included between the second polarizer 302 and the liquid crystal panel 20. Optionally, the fourth polarizer 304 is a reflection polarizer.

In one embodiment, the first polarizer 301 located on the light-emitting surface 20E side of the liquid crystal panel 20 and the second polarizer 302 located on the light-incident surface 20F side of the liquid crystal panel 20 may each be reflection polarizers. However, the first polarizer 301 and the second polarizer 302 may not be the polarizer closest to the liquid crystal panel 20. Specifically, the third polarizer 303 may be included between the first polarizer 301 and the liquid crystal panel 20, and the fourth polarizer 304 may be included between the second polarizer 302 and the liquid crystal panel 20. Optionally, no other polarizers may be included between the first polarizer 301 and the display surface 000E of the display module 000, and no other polarizer may be included between the third polarizer 303 and the light-emitting surface 20E of the liquid crystal panel 20. That is, the third polarizer 303 and the first polarizer 301 that are stacked may be disposed on the light-emitting surface 20E side of the liquid crystal panel 20.

The side of the light incident surface 20F of the liquid crystal panel 20 may also be disposed with the fourth polarizer 304 and the second polarizer 302 that are stacked. The fourth polarizer 304 is closer to the light incident surface 20F of the liquid crystal panel 20 than the second polarizer 302. That is, the second polarizer 302 is not the polarizer closest to the light incident surface 20F of the liquid crystal panel 20, and the fourth polarizer 304 is located on the side of the second polarizer 302 facing the liquid crystal panel 20.

In one embodiment, the upper and lower sides of the liquid crystal panel 20 respectively include two sets of stacked polarizers. The third polarizer 303 and the fourth polarizer 304 are respectively the polarizers closest to the liquid crystal panel 20. The third polarizer 303 is an absorption polarizer. Absorption polarizers generally have better polarization effects, that is, higher polarization levels. The third polarizer 303 disposed close to the light-emitting surface 20E of the liquid crystal panel 20 is an absorption polarizer. Accordingly, light leakage when the screen is dark may be reduced. The liquid crystal panel 20 may be prevented from emitting light when no electric field is applied, a better black state display image may be achieved, and the display contrast of the display module may be improved. The first polarizer 301 close to the display surface 000E of the display module 000, the second polarizer 302 and the fourth polarizer 304 close to the backlight module 000 may still be designed as reflection polarizers. In this way, not only the first polarizer 301 may block the heat in sunlight, but also the second polarizer 302 and the fourth polarizer 304 may block the heat generated by the backlight module from reaching the liquid crystal layer. As a result, the problem of temperature increase of the entire module may be eased.

The S light incident on the first polarizer 301 may be reflected back to the external environment, and the S light incident on the second polarizer 302 is reflected back into the backlight module 10. As such, not only the possibility of the heat generated by sunlight being absorbed by the first polarizer 301 may be reduced, but also the possibility of the heat being absorbed by the second polarizer 302 may be reduced. That is, the failure risks of the first polarizer 301 and the second polarizer 302 caused by excessive heat absorption may be reduced, and the polarization performance of the transmission light path in the entire module may be improved. In addition, since the S light incident on the first polarizer 301 may be reflected back into the external environment, and the S light incident on the second polarizer 302 may be reflected back into the backlight module, excessive heat may not reach the liquid crystal layer of the liquid crystal panel 20, the temperature of the liquid crystal molecules may not increase, and the anisotropy of the liquid crystal may not be reduced. That is, the transmittance of the liquid crystal panel may not be affected, and the transmittance of the entire liquid crystal display module may be improved.

In one embodiment, the fourth polarizer 304 and the second polarizer 302 are disposed, in a stacked way, on the light incident surface 20F side of the liquid crystal panel 20. The fourth polarizer 304 and the second polarizer 302 each are reflection polarizers. The polarization level of the polarizer on the light incident surface 20F side of the liquid crystal panel 20 may be increased by stacking reflection polarizers. The higher the level of polarization, the more the light emitted from the backlight may be reflected back, and the more the heat may be blocked. As such, excessive heat reaching the liquid crystal layer of the liquid crystal panel 20 may be prevented, and temperature increase of the liquid crystal molecules may be prevented. Accordingly, the transmittance of the liquid crystal panel may be improved, and the transmittance and display quality of the entire liquid crystal display module may be improved.

Figure 12:
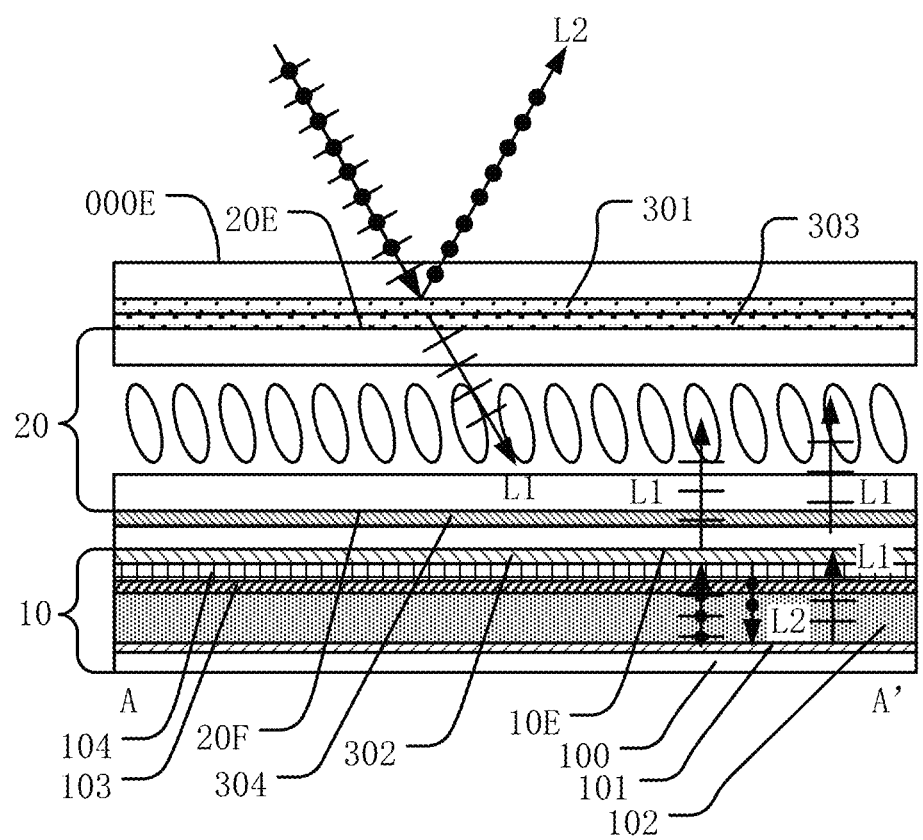
FIG. 12 illustrates another schematic cross-sectional structural diagram along the A-A' direction in FIG. 1, consistent with the disclosed embodiments of the present disclosure.

FIG. 12 illustrates another schematic cross-sectional structural diagram along the A-A' direction in FIG. 1. Referring to FIGS. 1 and 12, in one embodiment, the backlight module 10 includes a second polarizer 302.

In an example, the backlight module 10 is a side-type backlight module. The structure of the backlight module 10 may include a casing 100. The structure of the backlight module 10 may also include a reflective sheet 101, a light guide plate 102, a diffusion sheet 103, and a brightness enhancement film 104 that are arranged in sequence on a side of the casing 100 facing the liquid crystal panel 20. In one embodiment, the backlight module 10 includes a second polarizer 302. The fourth polarizer 304 and the second polarizer 302 are disposed, in a stacked way, on the light incident surface 20F side of the liquid crystal panel 20. The fourth polarizer 304 may be understood as a polarizer between the liquid crystal panel 20 and the backlight module 10. The second polarizer 302 may be disposed in the backlight module 10. The second polarizer 302 may be located on a side of the brightness enhancement film 104 facing the fourth polarizer 304. The second polarizer 302 may be understood as an optical film layer closest to the liquid crystal panel 20 in the backlight module 10, such that the second polarizer 302 of the reflection polarizer structure may serve as a structure of the backlight module 10. In this configuration, the third polarizer 303 and the fourth polarizer 304 may be understood as the upper polarizer and the lower polarizer that originally need to be provided on the upper and lower sides of the liquid crystal panel 20. The first polarizer 301 may be understood as a polarizer added on the display surface 000E side of the display module for reflecting part of the sunlight.

The second polarizer 302 of the reflection polarizer structure located in the backlight module 10 may also be used in combination with the reflective sheet 101 included in the backlight module 10. Optionally, the second polarizer 302 of the reflection polarizer structure may be a reflective polarizing brightness enhancement film, and a Dual Brightness Enhancement Film (DBEF) may be used as the reflective polarizing brightness enhancement film. When a light beam of the backlight source reaches the second polarizer 302, the P light (first light L1) in the light beam of the backlight source may pass through the second polarizer 302 and be incident on the liquid crystal panel 20. The S light (second light L2) in the light beam of the backlight source reflected by the second polarizer 302 may be reflected by the reflective sheet 101, and may then become P light (first light L1) and be reused. The light may continue to be incident on the liquid crystal panel 20 through the second polarizer 302 (as shown in the light path in FIG. 12). Accordingly, the transmittance of the light may be improved, the light utilization rate of the backlight module 10 may be improved, and the display brightness and display effect of the display module may be improved.

It should be noted that FIG. 12 only schematically illustrates the structure of the display module. During a specific implementation, between the backlight module 10 and the liquid crystal panel 20, for example, optical glue for fitting and fixing purposes may be included between the fourth polarizer 304 and the second polarizer 302. The edge of the backlight module 10 may also include structures such as light-shielding glue, and the side of the first polarizer 301 away from the liquid crystal panel 20 may also include a protective layer or a cover, etc. Such implementation details will not be elaborated here, and reference may be made to structures of liquid crystal display modules in the related art.

Still referring to FIGS. 1 and 11, in one embodiment, the first polarizer 301 is a reflection polarizer, and the second polarizer 302 is a reflection polarizer. The third polarizer 303 is disposed between the first polarizer 301 and the liquid crystal panel 20, and the third polarizer 303 is an absorption polarizer. The fourth polarizer 304 is disposed between the second polarizer 302 and the liquid crystal panel 20. Optionally, the fourth polarizer 304 is an absorption polarizer.

In one embodiment, the first polarizer 301 located on the light-emitting surface 20E side of the liquid crystal panel 20 and the second polarizer 302 located on the light-incident surface 20F side of the liquid crystal panel 20 may each be reflection polarizers. However, the first polarizer 301 and the second polarizer 302 may not be the polarizer closest to the liquid crystal panel 20. Specifically, the third polarizer 303 may be included between the first polarizer 301 and the liquid crystal panel 20, and the fourth polarizer 304 may be included between the second polarizer 302 and the liquid crystal panel 20. Optionally, no other polarizers may be included between the first polarizer 301 and the display surface 000E of the display module 000, and no other polarizer may be included between the third polarizer 303 and the light-emitting surface 20E of the liquid crystal panel 20. That is, the third polarizer 303 and the first polarizer 301 that are stacked may be disposed on the light-emitting surface 20E side of the liquid crystal panel 20.

The side of the light incident surface 20F of the liquid crystal panel 20 may also be disposed with the fourth polarizer 304 and the second polarizer 302 that are stacked. The fourth polarizer 304 is closer to the light incident surface 20F of the liquid crystal panel 20 than the second polarizer 302. That is, the second polarizer 302 is not the polarizer closest to the light incident surface 20F of the liquid crystal panel 20, and the fourth polarizer 304 is located on the side of the second polarizer 302 facing the liquid crystal panel 20.

In one embodiment, the upper and lower sides of the liquid crystal panel 20 respectively include two sets of stacked polarizers. The third polarizer 303 and the fourth polarizer 304 are respectively the polarizers closest to the liquid crystal panel 20. The third polarizer 303 and the fourth polarizer 304 each are absorption polarizers. The upper polarizer and the lower polarizer on the upper and lower sides of the liquid crystal panel 20 are absorption polarizers.

Absorption polarizers generally have better polarization effects, that is, higher polarization levels. Accordingly, since the third polarizer 303 disposed close to the light-emitting surface 20E of the liquid crystal panel 20 is an absorption polarizer, and the fourth polarizer 304 disposed close to the light incident surface 20F of the liquid crystal panel 20 is an absorption polarizer, light leakage when the screen is dark may be reduced, and light emitting may be prevented when the liquid crystal panel 20 does not apply an electric field. As such, a good black display image may be achieved, and the display contrast of the display module may be improved.

In one embodiment, the first polarizer 301 close to the display surface 000E of the display module 000 and the second polarizer 302 close to the backlight module 10 may be designed as reflection polarizers. The first polarizer 301 may block the heat in sunlight. The second polarizer 302 may block the heat generated by the backlight module from reaching the liquid crystal layer. As such, the problem of temperature increase of the entire display module may be eased. The S light incident on the first polarizer 301 may be reflected back to the external environment, and the S light incident on the second polarizer 302 is reflected back into the backlight module 10. As such, not only the possibility of the heat generated by sunlight being absorbed by the first polarizer 301 may be reduced, but also the possibility of the heat being absorbed by the second polarizer 302 may be reduced. That is, the failure risks of the first polarizer 301 and the second polarizer 302 caused by excessive heat absorption may be reduced, and the polarization performance of the transmission light path in the entire module may be improved. In addition, since the S light incident on the first polarizer 301 may be reflected back into the external environment, and the S light incident on the second polarizer 302 may be reflected back into the backlight module, excessive heat may not reach the liquid crystal layer of the liquid crystal panel 20, the temperature of the liquid crystal molecules may not increase, and the anisotropy of the liquid crystal may not be reduced. That is, the transmittance of the liquid crystal panel may not be affected, and the transmittance of the entire liquid crystal display module may be improved.

Optionally, as shown in FIG. 12, the backlight module 10 includes a second polarizer 302. That is, the second polarizer 302 may be used as an optical film layer inside the backlight module 10. Beneficial effects of disposing the second polarizer 302 inside the backlight module 10 are not elaborated here. For details, reference may be made to the descriptions of the above embodiments.

Figure 13:
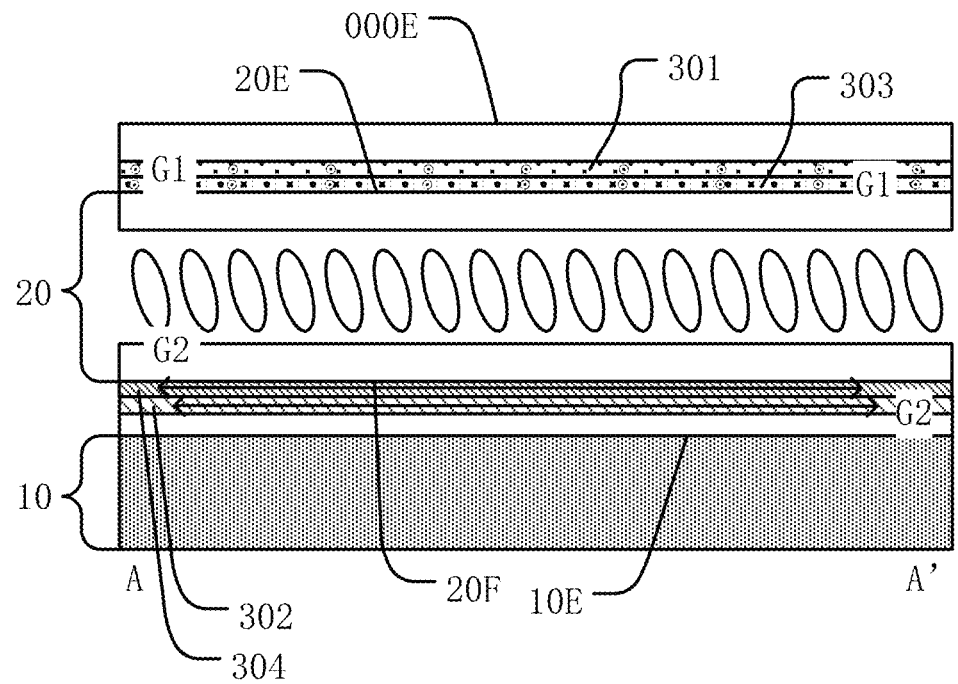
FIG. 13 illustrates a schematic diagram of polarization axis directions of a first polarizer, a second polarizer, a third polarizer, and a fourth polarizer in FIG. 11, consistent with the disclosed embodiments of the present disclosure.

FIG. 13 illustrates a schematic diagram of polarization axis directions of a first polarizer, a second polarizer, a third polarizer, and a fourth polarizer in FIG. 11. Optionally, as shown in FIGS. 1, 11 and 13, the first polarizer 301 and the third polarizer 303 are included between the display surface 000E of the display module 000 and the liquid crystal panel 20, and the first polarizer 301 and the third polarizer 303 are stacked. The first polarizer 301 and the third polarizer 303 are located on a same side of the liquid crystal panel 20 facing the display surface 000E of the display module 000. The direction of the polarization axis of the first polarizer 301 and the direction of the polarization axis of the third polarizer 303 are same.

The light incident surface 20F side of the liquid crystal panel 20 includes the second polarizer 302 and the fourth polarizer 304 that are stacked. The second polarizer 302 and the fourth polarizer 304 are located on a same side of the liquid crystal panel 20 away from the display surface 000E of the display module 000. The direction of the polarization axis of the second polarizer 302 and the direction of the polarization axis of the fourth polarizer 304 are same.

In one embodiment, the directions of the polarization axes of the first polarizer 301 and the third polarizer 303 located on a same side of the liquid crystal panel 20 facing the display surface 000E of the display module 000 are same. The directions of the polarization axes of the second polarizer 302 and the fourth polarizer 304 on a same side of the liquid crystal panel 20 away from the display surface 000E of the display module 000 are same. The directions of the polarization axes of the first polarizer 301 and the second polarizer 302 located on different sides of the liquid crystal layer of the liquid crystal panel 20 are perpendicular to each other. The directions of the polarization axes of the third polarizer 303 and the fourth polarizer 304 located on different sides of the liquid crystal layer of the liquid crystal panel 20 are perpendicular to each other. For example, as shown in FIG. 13, the direction of the polarization axis of the first polarizer 301 and the direction of the polarization axis of the third polarizer 303 each are the direction G1. The direction G1, noted by a point within a circle in FIG. 13, refers to a direction perpendicular to the paper surface, that is, a direction perpendicular to the plane seen by readers.

The direction of the polarization axis of the second polarizer 302 and the direction of the polarization axis of the fourth polarizer 304 each are the direction G2 in FIG. 13.

As such, the light beam generated by the backlight source may reach the second polarizer 302 and be converted into polarized light. After the P light passes through the second polarizer 302, since the direction of the polarization axes of the second polarizer 302 is same as the direction of the polarization axis of the fourth polarizer 304, the P light may continue to pass through the fourth polarizer 304. The S light may be reflected back to the reflective sheet of the backlight module 10, and may become P light and be reused. The light may then pass through the fourth polarizer 304 again. After deflection by the liquid crystal layer of the liquid crystal panel 20, the linearly polarized light may become elliptically polarized light, and may then be converted into linearly polarized light after being resolved by the third polarizer 303. Since the direction of the polarization axis of the first polarizer 301 is same as the direction of the polarization axis of the third polarizer 303, the light may continue to pass through the first polarizer 301 (the light is still linearly polarized light at this moment) and then generate a light-dark contrast on the display surface 000E of the display module, thereby generating a display image.

Figure 14:
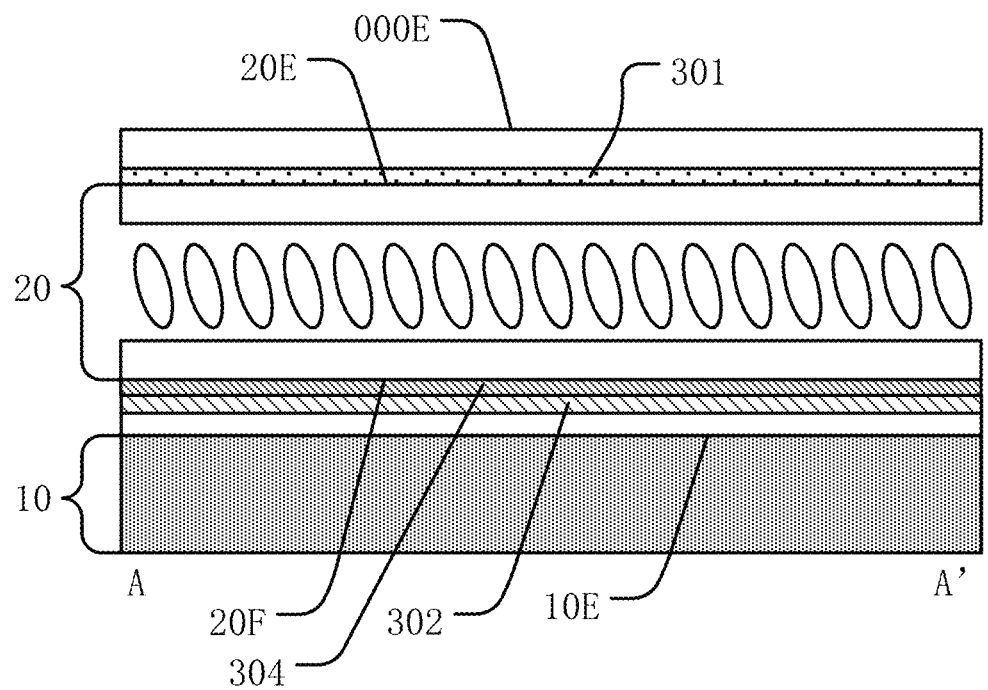
FIG. 14 illustrates another schematic cross-sectional structural diagram along the A-A' direction in FIG. 1, consistent with the disclosed embodiments of the present disclosure.

FIG. 14 illustrates another schematic cross-sectional structural diagram along the A-A' direction in FIG. 1. Referring to FIGS. 1 and 14, in one embodiment, the first polarizer 301 is a reflection polarizer, and the second polarizer 302 is a reflection polarizer. No other polarizers are included between the first polarizer 301 and the liquid crystal panel 20. No other polarizers are included between the first polarizer 301 and the display surface 000E of the display module 000. The fourth polarizer 304 is included between the second polarizer 302 and the liquid crystal panel 20. Optionally, the fourth polarizer 304 is a reflection polarizer.

In one embodiment, the polarizers located on the light incident surface 20F side and the light-emitting surface 20E side of the liquid crystal panel 20 may each be reflection polarizers. Specifically, the first polarizer 301 may be disposed on the light-emitting surface 20E side of the liquid crystal panel 20 facing the display surface 000E. The light-emitting surface 20E side of the liquid crystal panel 20 does not include other polarizers except the first polarizer 301, and the first polarizer 301 is a reflection polarizer. Through the first polarizer 301 of the reflection polarizer structure, the elliptically polarized light emitted from the liquid crystal layer of the liquid crystal panel 20 may be resolved into linearly polarized light such that users may see a display image. In addition, the first polarizer 301 may reflect part of sunlight or light in the external environment to achieve the effect of blocking external heat. Moreover, since the light-emitting surface 20E side of the liquid crystal panel 20 does not include other polarizers except the first polarizer 301, costs may be saved, the thickness of the module may be reduced, and a thin design of the display module may be achieved.

The light incident surface 20F side of liquid crystal panel 20 is disposed with the fourth polarizer 304 and the second polarizer 302 in a stacked way. The fourth polarizer 304 is closer to the light incident surface 20F of the liquid crystal panel 20 than the second polarizer 302. That is, the second polarizer 302 is not the polarizer closest to the light incident surface 20F of the liquid crystal panel 20, and the fourth polarizer 304 is located on the side of the second polarizer 302 facing the liquid crystal panel 20. The first polarizer 301 close to the display surface 000E of the display module 000, and the second polarizer 302 and the fourth polarizer 304 close to the backlight module 10 are reflection polarizers. As such, the first polarizer 301 may block the heat in sunlight, and the second polarizer 302 and the fourth polarizer 304 may block the heat generated by the backlight module from reaching the liquid crystal layer. Accordingly, the problems of sunlight backflow and temperature increase of the entire display module may be eased.

In one embodiment, the fourth polarizer 304 and the second polarizer 302 are disposed on the light incident surface 20F side of the liquid crystal panel 20 in a stacked way. The fourth polarizer 304 and the second polarizer 302 each are reflection polarizers. The polarization level of the polarizers on the light incident surface 20F side of the liquid crystal panel 20 may be increased by stacking the reflection polarizers. The higher the polarization, the more light emitted from the backlight source may be reflected back. Accordingly, more heat may be blocked, and excessive heat reaching the liquid crystal layer of the liquid crystal panel 20 may be prevented. Temperature increase of liquid crystal molecules may be avoided, and the transmittance of the liquid crystal panel may be improved. As such, the transmittance and display quality of the entire liquid crystal display module may be improved. Moreover, the polarization level may be increased by stacked reflection polarizers on the light incident surface 20F side of the liquid crystal panel 20. The higher the polarization level, the more light emitted from the backlight source may be reflected back. As such, more backlight heat may be blocked, and better temperature improvement effect may be achieved. Excessive heat reaching the liquid crystal layer of the Liquid crystal panel 20 may be prevented, and temperature increase of liquid crystal molecules may be avoided. Accordingly, the transmittance of the liquid crystal panel may be improved, and the transmittance and display quality of the entire liquid crystal display module may be improved.

Figure 15:
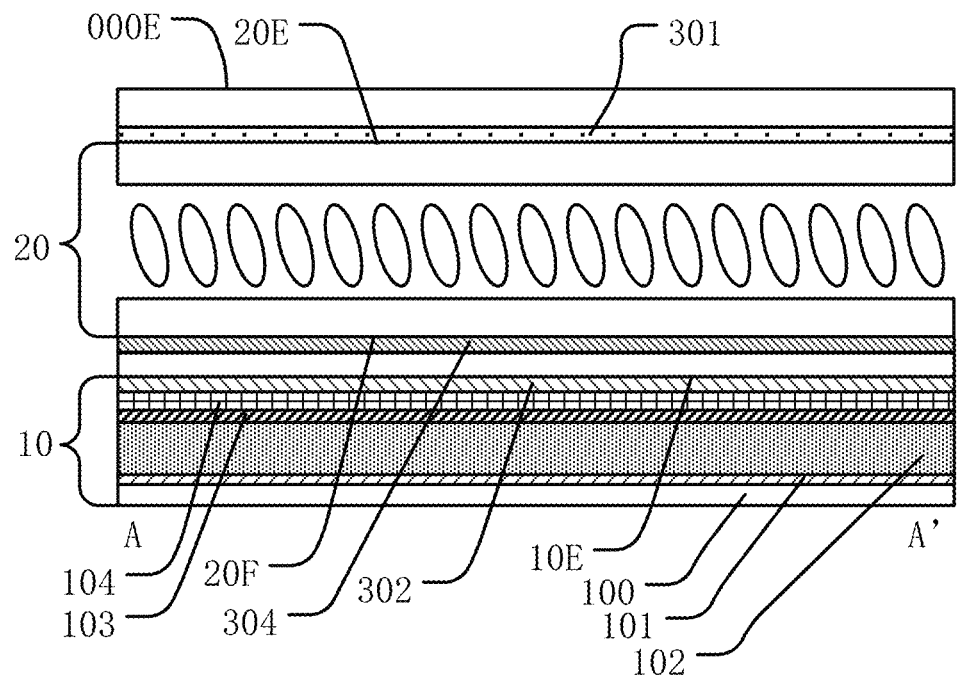
FIG. 15 illustrates another schematic cross-sectional structural diagram along the A-A' direction in FIG. 1, consistent with the disclosed embodiments of the present disclosure.

FIG. 15 illustrates another schematic cross-sectional structural diagram along the A-A' direction in FIG. 1. As shown in FIGS. 1 and 15, in one embodiment, the backlight module 10 includes a second polarizer 302. That is, the second polarizer 302 may be used as an optical film layer inside the backlight module 10. Beneficial effects of disposing the second polarizer 302 inside the backlight module 10 will not be elaborated here. For details, reference may be made to the description of the embodiment shown in FIG. 12.

Still referring to FIGS. 1, 2 and 6, in one embodiment, the first polarizer 301 and the second polarizer 302 each are reflection polarizers. No other polarizers are included between the first polarizer 301 and the display surface 000E of the display module 000, and no other polarizers are included between the first polarizer 301 and the liquid crystal panel 20. That is, the side of the liquid crystal panel 20 facing the display surface 000E of the display module 000 only includes the first polarizer 301. No other polarizers are included between the second polarizer 302 and the backlight module 10, and no other polarizers are included between the second polarizer 302 and the liquid crystal panel 20. That is, the side of the light incident surface 20F of the liquid crystal panel 20 facing the light-emitting surface 10E of the backlight module 10 only includes the second polarizer 302.

In one embodiment, the first polarizer 301 and the second polarizer 302 may be understood as an upper polarizer and a lower polarizer disposed on the upper side and the lower side of the outside of the liquid crystal panel 20 respectively. The liquid crystal panel 20 itself may not emit light and needs to be used with the backlight source provided by the backlight module 10. The working principle is generally to control the rotation of liquid crystal molecules in the liquid crystal layer by applying a driving voltage, such that the polarization state of the light of the backlight module 10 may be changed. Through the upper polarizer and the lower polarizer arranged outside the liquid crystal panel 20, penetration and blocking of the light path may be realized to control the amount of light transmission, and finally the light from the backlight module 10 may be refracted to produce an image.

This design of the display module 000 does not require changing the overall thickness of the display module. It is only necessary to set the upper polarizer and the lower polarizer on the upper side and the lower side of the liquid crystal panel 20 included in the display module as reflection polarizers. That is, the upper polarizer, that is, the first polarizer 301 included in the exterior of the liquid crystal panel 20, is replaced with a reflection polarizer. The lower polarizer, that is, the second polarizer 302 included on the outside of the liquid crystal panel 20, is replaced with a reflection polarizer. Accordingly, the heat in the sunlight may be blocked, and the heat generated by the backlight module may be blocked from reaching the liquid crystal layer. As such, the problems of sunlight backflow and temperature increase may be eased.

In this configuration, the S light incident on the first polarizer 301 may be reflected back into the external environment, and the S light incident on the second polarizer 302 may be reflected back into the backlight module 10. As such, the possibility of the heat generated by sunlight being absorbed by the first polarizer 301 may be reduced, and the possibility of the heat being absorbed by the second polarizer 302 may be reduced. That is, the failure risks of the first polarizer 301 and the second polarizer 302 caused by excessive heat absorption may be reduced. As such, the polarization performance of the transmission optical path in the entire module may be improved. In addition, there is no need to add an additional film layer structure to the module. It is only necessary to replace the upper polarizer and the lower polarizer. As such, costs may be saved, and the manufacturing process may be simplified. In addition, the thickness of the display module may be reduced, and a thin design of the display module may be achieved.

Figure 16:
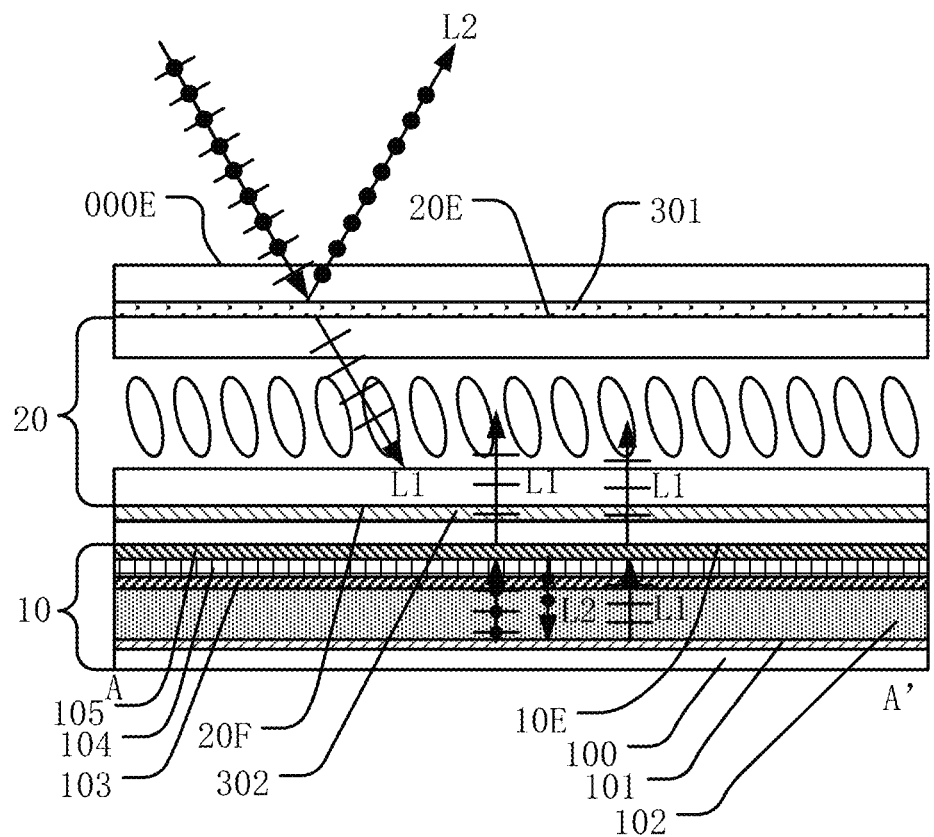
FIG. 16 illustrates another schematic cross-sectional structural diagram along the A-A' direction in FIG. 1, consistent with the disclosed embodiments of the present disclosure.

FIG. 16 illustrates another schematic cross-sectional structural diagram along the A-A' direction in FIG. 1. Referring to FIGS. 1, 2 and 16, in one embodiment, the first polarizer 301 may be a reflection polarizer, and the second polarizer 302 may be an absorption polarizer.

In one embodiment, the first polarizer 301 is the polarizer closest to the light-emitting surface 20E of the liquid crystal panel 20, and the second polarizer 302 is the polarizer closest to the light incident surface 20F of the liquid crystal panel 20. Specifically, no other polarizers are included between the first polarizer 301 and the liquid crystal panel 20. No other polarizers are included between the first polarizer 301 and the display surface 000E of the display module 000. No other polarizers are included between the second polarizer 302 and the liquid crystal panel 20. No other polarizers are included between the second polarizer 302 and the light-emitting surface 10E of the backlight module 10.

In one embodiment, the first polarizer 301 and the second polarizer 302 may be understood as an upper polarizer and a lower polarizer disposed on the upper side and the lower side of the outside of the liquid crystal panel 20 respectively. The liquid crystal panel 20 itself may not emit light and needs to be used with the backlight source provided by the backlight module 10. The working principle is generally to control the rotation of liquid crystal molecules in the liquid crystal layer by applying a driving voltage, such that the polarization state of the light of the backlight module 10 may be changed. Through the upper polarizer and the lower polarizer arranged outside the liquid crystal panel 20, penetration and blocking of the light path may be realized to control the amount of light transmission, and finally the light from the backlight module 10 may be refracted to produce an image.

This design of the display module 000 does not require changing the overall thickness of the module. It is only necessary to replace the upper polarizer on the upper side of the liquid crystal panel 20 included in the display module, that is, the upper polarizer included on the outside of the liquid crystal panel 20, i.e. the first polarizer 301, with a reflection polarizer. As such, costs may be saved. In addition, when the P light in the exterior sunlight reaches the first polarizer 301, the P light may continue to transmit to the liquid crystal layer of the liquid crystal panel 20, and the S light may be reflected by the first polarizer 301, as shown in the optical path in FIG. 16. Accordingly, heat in the exterior sunlight may be blocked, and problems of sunlight backflow and temperature increase may be eased.

The lower polarizer, that is, the second polarizer 302 included on the outside of the liquid crystal panel 20 may be still an absorption polarizer. Absorption polarizers generally have better polarization effects, that is, higher polarization levels. As such, the second polarizer 302 disposed close to the light incident surface 20F of the liquid crystal panel 20 may still be designed as an absorption polarizer, and there is no need to change the original design. In such a configuration, light leakage when the screen is dark may be reduced, and light emitting may be prevented when no electric field is applied to the liquid crystal panel 20. As such, a good black display image may be achieved, and the display contrast of the display module may be improved.

In one embodiment, there is no need to add an additional film structure in the module. It is only necessary to replace the upper polarizer on the upper side of the liquid crystal panel 20. As such, costs may be saved, and the manufacturing process may be simplified. In addition, the thickness of the display module may be reduced, and a thin design of the display module may be achieved.

As shown in FIG. 1 and FIG. 16, in one embodiment, the side of the backlight module 10 close to the light-emitting surface 10E of the backlight module 10 may also include a reflective polarizing brightness enhancement film 105, and a Dual Brightness Enhancement Film (DBEF) may be used as the reflective polarizing brightness enhancement film. The backlight module 10 may also include a reflective sheet 101 inside. The reflective sheet 101 is located on the side of the reflective polarizing brightness enhancement film 105 away from the light-emitting surface 10E of the backlight module 10. As such, the reflective polarizing brightness enhancement film 105 and the reflective sheet 101 may be combined. The reflective polarizing brightness enhancement film 105 may selectively transmit the P light of the backlight source and reflect the S light of the backlight source. The S light in the backlight source reflected by the reflective polarizing brightness enhancement film 105 may be reflected by the reflective sheet 101 and then become P light and be reused, as shown in the light path in FIG. 16. Accordingly, the light utilization rate of the backlight module may be improved, and the display brightness and display effect of the display module may be improved.

Still referring to FIGS. 1 and 5, in one embodiment, the first polarizer 301 is an absorption polarizer, and the second polarizer 302 is a reflection polarizer.

In one embodiment, the first polarizer 301 is the polarizer closest to the light-emitting surface 20E of the liquid crystal panel 20, and the second polarizer 302 is the polarizer closest to the light incident surface 20F of the liquid crystal panel 20. That is, no other polarizers are included between the first polarizer 301 and the liquid crystal panel 20. No other polarizers are included between the first polarizer 301 and the display surface 000E of the display module 000. No other polarizers are included between the second polarizer 302 and the liquid crystal panel 20. No other polarizers are included between the second polarizer 302 and the light-emitting surface 10E of the backlight module 10.

In one embodiment, the first polarizer 301 and the second polarizer 302 may be understood as an upper polarizer and a lower polarizer disposed on the upper side and the lower side of the outside of the liquid crystal panel 20 respectively. The liquid crystal panel 20 itself may not emit light and needs to be used with the backlight source provided by the backlight module 10. The working principle is generally to control the rotation of liquid crystal molecules in the liquid crystal layer by applying a driving voltage, such that the polarization state of the light of the backlight module 10 may be changed. Through the upper polarizer and the lower polarizer arranged outside the liquid crystal panel 20, penetration and blocking of the light path may be realized to control the amount of light transmission, and finally the light from the backlight module 10 may be refracted to produce an image.

This design of the display module 000 does not require changing the overall thickness of the module. It is only necessary to replace the lower polarizer on the lower side of the liquid crystal panel 20 included in the display module, that is, the lower polarizer included on the outside of the liquid crystal panel 20, i.e. the second polarizer 302, with a reflection polarizer. When the P light in the backlight source of the backlight module 10 reaches the second polarizer 302, the P light may pass through and continue to propagate to the liquid crystal layer of the liquid crystal panel 20, and the S light may be reflected by the second polarizer 302, as shown in the optical path in FIG. 5. As such, heat from the backlight module may be blocked, and the problem of temperature increase of the entire display module may be eased.

The upper polarizer included on the outside of the liquid crystal panel 20, that is, the first polarizer 301, may still be an absorption polarizer. Absorption polarizers generally have better polarization effects, that is, higher polarization levels. Accordingly, when the first polarizer 301 disposed close to the light-emitting surface 20E of the liquid crystal panel 20 is still designed as an absorption polarizer, there is no need to change the original design, and costs may thus be saved. In addition, light leakage when the screen is dark may be reduced, and light emitting may be prevented when no electric field is applied to the liquid crystal panel 20. As such, a good black display image may be achieved, and the display contrast of the display module may be improved.

Figure 17:
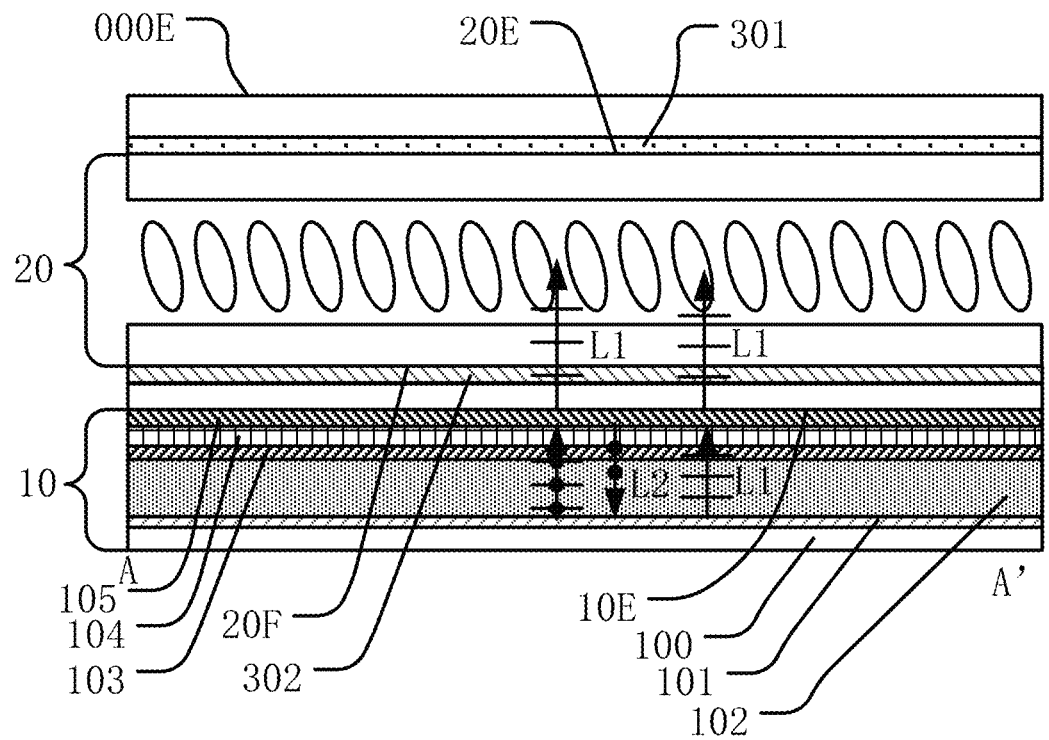
FIG. 17 illustrates another schematic cross-sectional structural diagram along the A-A' direction in FIG. 1, consistent with the disclosed embodiments of the present disclosure.

FIG. 17 illustrates another schematic cross-sectional structural diagram along the A-A' direction in FIG. 1. As shown in FIGS. 1 and 17, in one embodiment, the side of the backlight module 10 close to the light-emitting surface 10E of the backlight module 10 may also include the reflective polarizing brightness enhancement film 105. The reflective polarizing brightness enhancement film 105 is also a type of reflection polarizer. That is, the light incident surface 20F side of the liquid crystal panel 20 is disposed, in a stacked way, with the second polarizer 302 of the reflection polarizer structure and the reflective polarizing brightness enhancement film 105. The polarization level may be increased by the stacked reflection polarizers. The higher the polarization level, the more light from sunlight may be reflected back, and the more heat may be blocked. As such, excessive heat reaching the liquid crystal layer of the liquid crystal panel 20 may be prevented, and the temperature increase of the liquid crystal molecules may be prevented. The transmittance of the liquid crystal panel may be improved, and the transmittance and display quality of the entire liquid crystal display module may be improved.

The backlight module 10 may also include a reflective sheet 101 inside. The reflective sheet 101 is located on the side of the reflective polarizing brightness enhancement film 105 away from the light-emitting surface 10E of the backlight module 10. As such, the reflective polarizing brightness enhancement film 105 and the reflective sheet 101 may be combined. The reflective polarizing brightness enhancement film 105 may selectively transmit the P light of the backlight source and reflect the S light of the backlight source. The S light in the backlight source reflected by the reflective polarizing brightness enhancement film 105 may be reflected by the reflective sheet 101 and then become P light and be reused, as shown in the light path in FIG. 17. Accordingly, the light utilization rate of the backlight module may be improved, and the display brightness and display effect of the display module may be improved.

Figure 18:
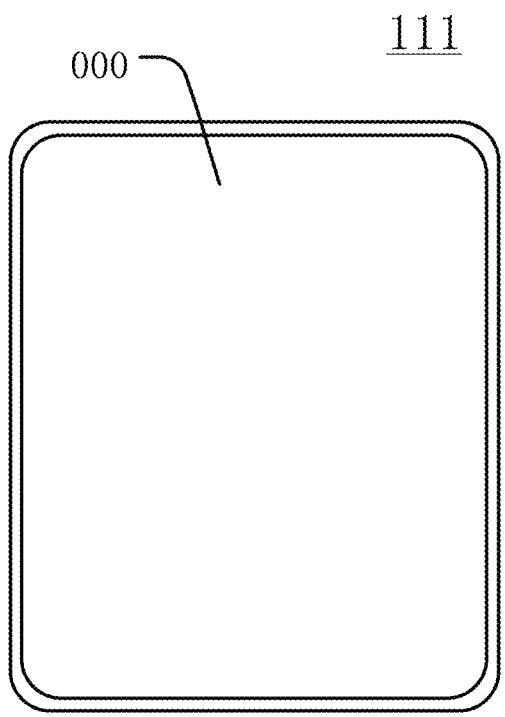
FIG. 18 illustrates a schematic planar structural diagram of a display device consistent with the disclosed embodiments of the present disclosure.

The present disclosure also provides a display device. FIG. 18 illustrates a schematic planar structural diagram of a display device consistent with the disclosed embodiments of the present disclosure. Referring to FIG. 18, the display device 111 includes a display module 000 provided by the present disclosure. FIG. 18 takes a mobile phone as an example to illustrate the display device 111. It may be understood that the display device 111 provided by the present disclosure may be a computer, a television, a vehicle-mounted display device, or other display device with a display function. The present disclosure does not specifically limit a specific display device. The display device 111 provided by the present disclosure has the beneficial effects of the display module 000 provided by the present disclosure. For details, reference may be made to specific descriptions of the display modules 000 in the present disclosure, which will not be repeated here.

Figure 19:
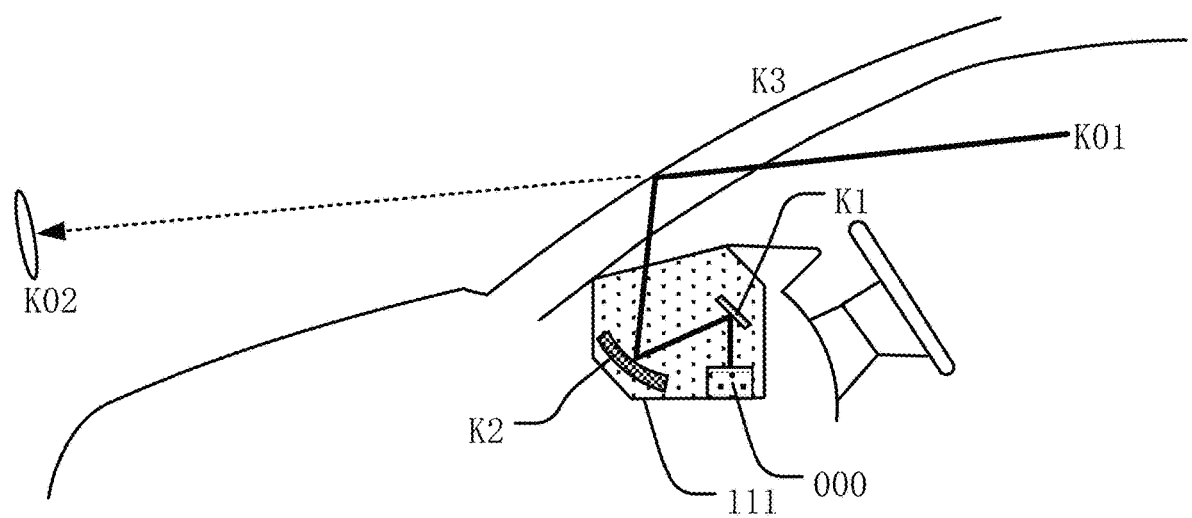
FIG. 19 illustrates a schematic structural diagram of applying a display device in a head-up display system for vehicle-mounted display, consistent with the disclosed embodiments of the present disclosure.

FIG. 19 illustrates a schematic structural diagram of applying a display device in a head-up display system for vehicle-mounted display, consistent with the disclosed embodiments of the present disclosure. As shown in FIG. 19, the display device 111 may include a vehicle-mounted head-up display device. That is, the display device 111 may be applied to a head-up display system for vehicle-mounted display. The display device 111 may also include other structures such as a correction plane mirror K1, a concave mirror K2, etc. When a head-up display system is used for vehicle-mounted display, a vehicle may include a windshield K3. As shown in FIG. 19, K01 is a user's sight point, and K02 is a virtual image point, that is, an image position when a user looks up. The present disclosure does not elaborate on the display principle of the head-up display system. For details, reference may be made to structures and working principles of vehicle head-up display devices in related technologies. Since a display device used in a vehicle may be exposed to sunlight for a long time, the display device 111 including the display module 000 provided by the present disclosure may solve the problem caused by sunlight backflow and temperature increase in the display module, and the display effect of the vehicle head-up display device may thus be improved.

As disclosed, the technical solutions of the present disclosure have the following advantages.

The display module provided by the present disclosure includes a backlight module and a liquid crystal panel arranged oppositely to the backlight module. The backlight module is configured to provide a backlight source for the liquid crystal panel. The light-emitting surface of the backlight module may be understood as a side surface of the backlight module that forms the backlight source. The display surface of the display module may be understood as the side surface of the entire display module that displays a display image to a user.

In the present disclosure, at least one of the first polarizer and the second polarizer is a reflection polarizer. That is, the first polarizer disposed on the side of the liquid crystal panel facing the display surface is a reflection polarizer; or, the second polarizer disposed on the side of the liquid crystal panel away from the display surface is a reflection polarizer; or, the first polarizer disposed on the side of the liquid crystal panel facing the display surface is a reflection polarizer, and the second polarizer provided on the side of the liquid crystal panel away from the display surface is also a reflection polarizer.

In the present disclosure, at least one of the first polarizer and the second polarizer is a reflection polarizer. Since the reflection polarizer may absorb part of the light and reflect part of the light, the reflection polarizer may block heat and the temperature of the reflection polarizer may not increase because of absorbing heat. Accordingly, the reflection polarizer may reduce the risk of polarizer failure caused by excessive heat absorption, the polarization performance of the transmission optical path in the entire module may be improved, and the display quality may be improved. In addition, since part of the light incident on the reflection polarizer may be reflected back, excessive heat reaching the liquid crystal layer of the liquid crystal panel 20 may prevented, and the temperature of the liquid crystal molecules may not increase. Accordingly, the anisotropy of the liquid crystal may not be reduced, that is, the transmittance of the liquid crystal panel may not be affected, and the transmittance and display quality of the entire liquid crystal display module may be improved.

The embodiments disclosed herein are exemplary only and not limiting the scope of the present disclosure. Various combinations, alternations, modifications, equivalents, or improvements to the technical solutions of the disclosed embodiments may be obvious to those skilled in the art. Without departing from the spirit and scope of this disclosure, such combinations, alternations, modifications, equivalents, or improvements to the disclosed embodiments are encompassed within the scope of the present disclosure.

What is claimed is:

1. A display module, comprising a backlight module and a liquid crystal panel disposed oppositely to the backlight module, wherein:
   the liquid crystal panel is disposed on a side of a light-emitting surface of the backlight module;
   the display module includes a display surface, wherein the display surface is located on a side of the liquid crystal panel away from the backlight module;
   a side of the liquid crystal panel facing the display surface includes a first polarizer, and a side of the liquid crystal panel away from the display surface includes a second polarizer;
   at least one of the first polarizer and the second polarizer is a reflection polarizer; and
   a direction of a polarization axis of the first polarizer and a direction of a polarization axis of the second polarizer are perpendicular to each other,
   wherein:
     the reflection polarizer includes a first protective layer and a second protective layer disposed oppositely to the first protective layer;
     N pieces of optical film sets, arranged in a stacked way, are included between the first protective layer and the second protective layer, wherein N is a positive integer, and N≥200; and
     one piece of optical film set of the N pieces of optical film sets includes a first optical film and a second optical film, wherein a refractive index of the first optical film is different from a refractive index of the second optical film.

2. The display module according to claim 1, wherein: the first polarizer is a reflection polarizer, and the second polarizer is a reflection polarizer.

3. The display module according to claim 2, wherein: a third polarizer is included between the first polarizer and the liquid crystal panel.

4. The display module according to claim 3, wherein: the third polarizer is a reflection polarizer.

5. The display module according to claim 3, wherein: the third polarizer is an absorption polarizer.

6. The display module according to claim 3, wherein: a direction of a polarization axis of the first polarizer and a direction of a polarization axis of the third polarizer are same.

7. The display module according to claim 2, wherein: a fourth polarizer is included between the second polarizer and the liquid crystal panel.

8. The display module according to claim 7, wherein: the fourth polarizer is a reflection polarizer.

9. The display module according to claim 7, wherein: the fourth polarizer is an absorption polarizer.

10. The display module according to claim 7, wherein: the backlight module includes the second polarizer.

11. The display module according to claim 7, wherein: a direction of a polarization axis of the second polarizer and a direction of a polarization axis of the fourth polarizer are same.

12. The display module according to claim 1, wherein: the first polarizer is a reflection polarizer, and the second polarizer is an absorption polarizer.

13. The display module according to claim 1, wherein: the first polarizer is an absorption polarizer, and the second polarizer is a reflection polarizer.

14. The display module according to claim 1, wherein: the backlight module includes a reflective sheet.

15. The display module according to claim 1, wherein: a side of the reflection polarizer facing the display surface includes a plurality of diffusion particles.

16. The display module according to claim 1, wherein: a side of the backlight module close to the light-emitting surface of the backlight module includes a reflective polarizing brightness enhancement film; and
   the backlight module further includes a reflective sheet, wherein the reflective sheet is located on a side of the reflective polarizing brightness enhancement film away from the light-emitting surface of the backlight module.

17. A display device, comprising a display module including a backlight module and a liquid crystal panel disposed oppositely to the backlight module, wherein:
   the liquid crystal panel is disposed on a side of a light-emitting surface of the backlight module;
   the display module includes a display surface, wherein the display surface is located on a side of the liquid crystal panel away from the backlight module;
   a side of the liquid crystal panel facing the display surface includes a first polarizer, and a side of the liquid crystal panel away from the display surface includes a second polarizer;
   at least one of the first polarizer and the second polarizer is a reflection polarizer; and
   a direction of a polarization axis of the first polarizer and a direction of a polarization axis of the second polarizer are perpendicular to each other,
   wherein:
     the reflection polarizer includes a first protective layer and a second protective layer disposed oppositely to the first protective layer;
     N pieces of optical film sets, arranged in a stacked way, are included between the first protective layer and the second protective layer, wherein N is a positive integer, and N≥200; and
     one piece of optical film set of the N pieces of optical film sets includes a first optical film and a second optical film, wherein a refractive index of the first optical film is different from a refractive index of the second optical film.

18. The display device according to claim 17, wherein: the display device includes a vehicle-mounted head-up display device.

* * * * *